United States Patent
Atohira et al.

(10) Patent No.: US 10,857,673 B2
(45) Date of Patent: Dec. 8, 2020

(54) DEVICE, METHOD, PROGRAM AND RECORDING MEDIUM, FOR SIMULATION OF ARTICLE ARRAYING OPERATION PERFORMED BY ROBOT

(71) Applicant: FANUC CORPORATION, Yamanashi (JP)

(72) Inventors: Hiroyuki Atohira, Yamanashi (JP); Yoshiharu Nagatsuka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 6 days.

(21) Appl. No.: 15/795,671

(22) Filed: Oct. 27, 2017

(65) Prior Publication Data
US 2018/0117766 A1 May 3, 2018

(30) Foreign Application Priority Data
Oct. 28, 2016 (JP) ................................. 2016-211940

(51) Int. Cl.
*B25J 9/16* (2006.01)
*B65G 47/90* (2006.01)
*G05B 19/418* (2006.01)

(52) U.S. Cl.
CPC .......... *B25J 9/1671* (2013.01); *B25J 9/1697* (2013.01); *B65G 47/905* (2013.01);
(Continued)

(58) Field of Classification Search
CPC ..... B25J 9/1671; B25J 9/1697; B65G 47/905; G05B 19/4182
(Continued)

(56) References Cited

U.S. PATENT DOCUMENTS 5,040,056 A * 8/1991 Sager ................... B25J 9/0093
348/88
5,727,132 A * 3/1998 Arimatsu ........... G05B 19/4083
700/259
(Continued)

FOREIGN PATENT DOCUMENTS

CN 101034418 A 9/2007
CN 104876021 A 9/2015
(Continued)

OTHER PUBLICATIONS

Kale et al. ("Automation of Object Sorting System Using Pick & Place Robotic Arm & Image Processing", Proceedings of 3rd IRAJ International Conference, 2014, pp. 56-60) (Year: 2014).*
(Continued)

*Primary Examiner* — Iftekhar A Khan
(74) *Attorney, Agent, or Firm* — Hauptman Ham, LLP

(57) ABSTRACT

A simulation device for a robot rearranging articles in a random arrangement on a conveyor to a regular arrangement while tracking the conveyor. The simulation device includes a model locating section for locating a conveyor model, a plurality of article models, a sensor model and an arraying robot model in a virtual space; a conveying motion simulating section for making the conveyor model convey the article models in the random arrangement; a detecting motion simulating section for making the sensor model obtain position information of the article models; an arrangement pattern generating section for generating an arrangement pattern on the conveyor model; and an arraying motion simulating section for making the arraying robot model pick up the article models in the random arrangement and place the picked-up article models in accordance with the arrangement pattern, while tracking an article conveying motion.

7 Claims, 14 Drawing Sheets

(52) U.S. Cl.
CPC ............. *G05B 19/4182* (2013.01); *G05B 2219/39106* (2013.01); *G05B 2219/40308* (2013.01); *Y02P 90/083* (2015.11)

(58) Field of Classification Search
USPC .......................................................... 703/1
See application file for complete search history.

(56) References Cited

U.S. PATENT DOCUMENTS

| | | | | |
|---|---|---|---|---|
| 6,315,103 B1* | 11/2001 | Boucherie | ............ | A46D 3/085 198/395 |
| 6,374,984 B1* | 4/2002 | Nagler | ............ | B07C 5/361 177/1 |
| 6,646,404 B2* | 11/2003 | Okuyama | ............ | B25J 9/1669 318/568.13 |
| 6,779,647 B1* | 8/2004 | Nagler | ............ | A22C 17/0093 198/395 |
| 7,177,459 B1* | 2/2007 | Watanabe | ............ | B25J 9/1697 382/151 |
| 7,386,367 B2* | 6/2008 | Watanabe | ............ | B25J 9/1612 700/245 |
| 7,657,346 B2* | 2/2010 | Ban | ............ | B25J 9/1697 318/568.16 |
| 7,881,917 B2* | 2/2011 | Nagatsuka | ............ | B25J 9/1671 703/6 |
| 8,014,899 B2* | 9/2011 | Ban | ............ | B25J 9/0093 198/340 |
| 8,805,585 B2* | 8/2014 | Nishihara | ............ | B25J 9/0093 198/339.1 |
| 9,221,617 B2* | 12/2015 | Waller | ............ | B65G 23/44 |
| 9,643,796 B2* | 5/2017 | Koga | ............ | B25J 9/1697 |
| 9,776,808 B1* | 10/2017 | Ooba | ............ | B65G 47/1428 |
| 2005/0071048 A1* | 3/2005 | Watanabe | ............ | B25J 9/1674 700/259 |
| 2005/0096892 A1* | 5/2005 | Watanabe | ............ | B25J 9/1671 703/7 |
| 2006/0057239 A1* | 3/2006 | Hariki | ............ | B65G 47/1457 425/126.1 |
| 2006/0149421 A1* | 7/2006 | Akiyama | ............ | B25J 9/1664 700/245 |
| 2007/0179671 A1* | 8/2007 | Arimatsu | ............ | G05B 19/4182 700/247 |
| 2007/0213874 A1* | 9/2007 | Oumi | ............ | B25J 9/1697 700/245 |
| 2007/0282485 A1* | 12/2007 | Nagatsuka | ............ | B25J 9/1671 700/245 |
| 2008/0013825 A1* | 1/2008 | Nagatsuka | ............ | B25J 9/1671 382/153 |
| 2008/0082213 A1* | 4/2008 | Ban | ............ | B25J 9/1697 700/260 |
| 2008/0301072 A1* | 12/2008 | Nagatsuka | ............ | B25J 9/1669 706/12 |
| 2009/0069939 A1* | 3/2009 | Nagatsuka | ............ | B25J 9/1671 700/258 |
| 2010/0106297 A1* | 4/2010 | Inazumi | ............ | G01S 5/186 700/245 |
| 2010/0268370 A1* | 10/2010 | Nishiuchi | ............ | B25J 9/026 700/112 |
| 2011/0046783 A1* | 2/2011 | Benchikh | ............ | B25J 9/1671 700/254 |
| 2012/0029686 A1* | 2/2012 | Ban | ............ | B25J 9/1679 700/218 |
| 2013/0114861 A1* | 5/2013 | Takizawa | ............ | G06T 7/74 382/106 |
| 2014/0067317 A1* | 3/2014 | Kobayashi | ............ | B25J 9/1697 702/153 |
| 2014/0214394 A1* | 7/2014 | Inoue | ............ | B25J 9/1671 703/13 |
| 2014/0371905 A1* | 12/2014 | Eberst | ............ | B25J 9/1671 700/253 |
| 2015/0130794 A1* | 5/2015 | Katsuda | ............ | G06T 15/20 345/419 |
| 2015/0161808 A1* | 6/2015 | Oya | ............ | G06F 30/17 345/633 |
| 2015/0246778 A1* | 9/2015 | Koga | ............ | B25J 9/1697 700/259 |
| 2015/0254380 A1* | 9/2015 | Kimoto | ............ | B25J 9/1671 703/13 |
| 2015/0261899 A1* | 9/2015 | Atohira | ............ | B25J 9/1687 703/7 |
| 2017/0091999 A1* | 3/2017 | Blumenfeld | ............ | B25J 9/1605 |
| 2017/0140521 A1* | 5/2017 | Sakaguchi | ............ | B25J 9/1605 |
| 2017/0235300 A1* | 8/2017 | Maruno | ............ | G06T 7/74 700/112 |
| 2017/0236262 A1* | 8/2017 | Ohnuki | ............ | G06K 9/6215 700/30 |
| 2018/0243905 A1* | 8/2018 | Atohira | ............ | G05B 19/4182 |

FOREIGN PATENT DOCUMENTS

| | | |
|---|---|---|
| DE | 112009001414 T5 | 4/2011 |
| DE | 102015102740 A1 | 9/2015 |
| EP | 1769891 B1 | 10/2014 |
| JP | 2007-241857 A | 9/2007 |
| JP | 2008-296330 A | 12/2008 |
| JP | 2010-214556 A | 9/2010 |
| JP | 2015-214012 A | 12/2015 |

OTHER PUBLICATIONS

Diana Paola Blanco Rendon ("Modelling and simulation of a scheduling algorithm for a pick-and-place packaging system", Politecnico Di Milano, pp. 1-70) (Year: 2012).*

D. Kugelmann ("Autonomous Robotic Handling Applying Sensor Systems and 3D simulation", IEEE, 1994, pp. 196-201) (Year: 1994).*

Bozma et al. ("Multirobot coordination in pick-and-place tasks on a moving conveyor", Elsevier, 2012, pp. 530-538) (Year: 2012).*

Diana Paola Blanco Rendon ("Modelling and simulation of a scheduling algorithm for a pick-and-place packaging system", Politecnico Di Milano, 2013, pp. 1-70) (Year: 2013).*

Bozma et al. ("Multirobot coordination in pick-and-place tasks on a moving conveyor",Robotics and Computer-Integrated Manufacturing 28 (2012) 530-538) (Year: 2012).*

Humbert et al. ("Comparative analysis of pick & place strategies for a multi-robot application", IEEE, 2015, pp. 1-8) (Year: 2015).*

* cited by examiner

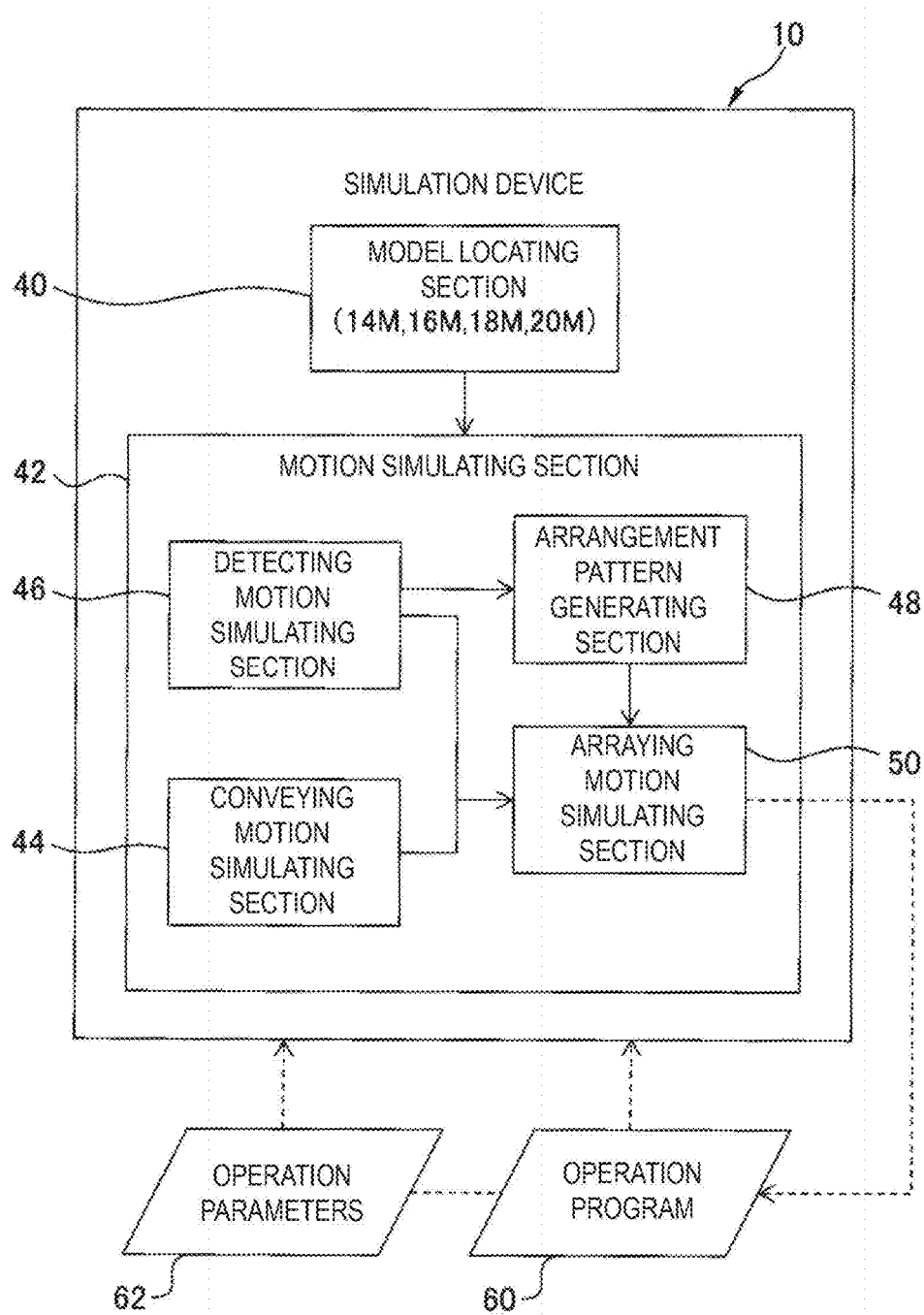

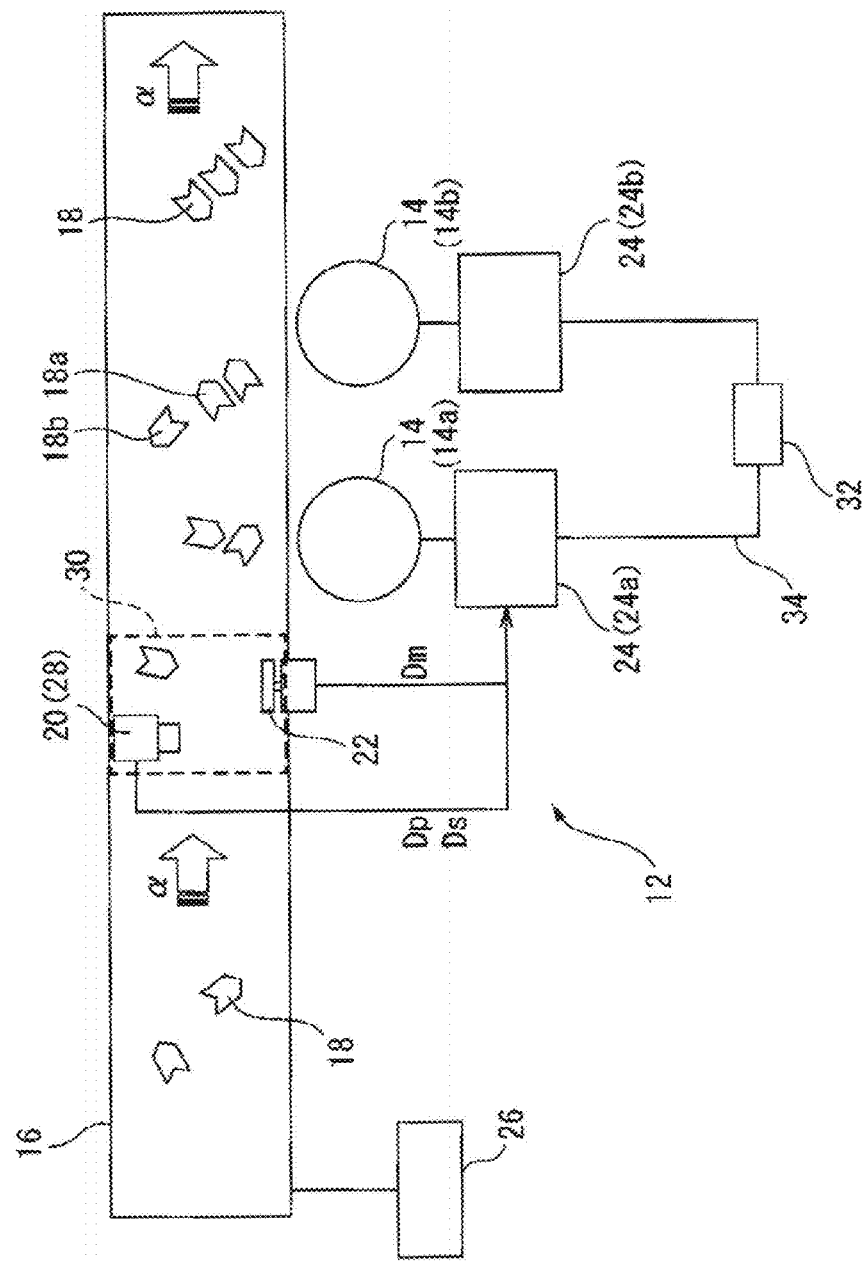

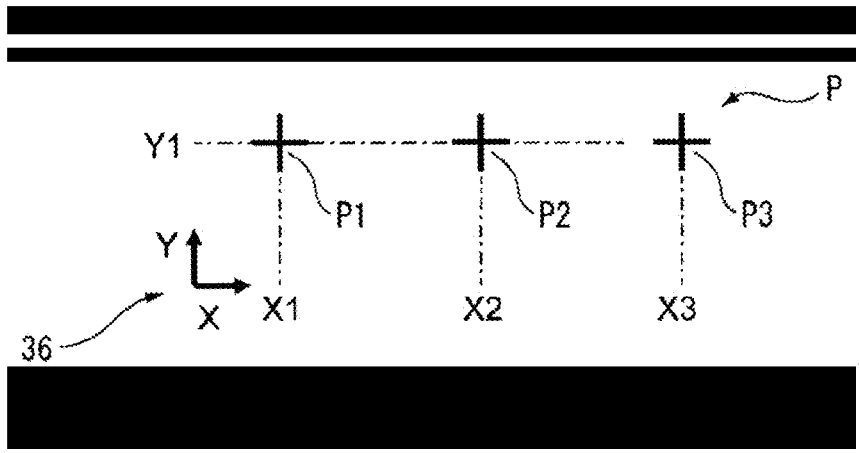
FIG. 3A
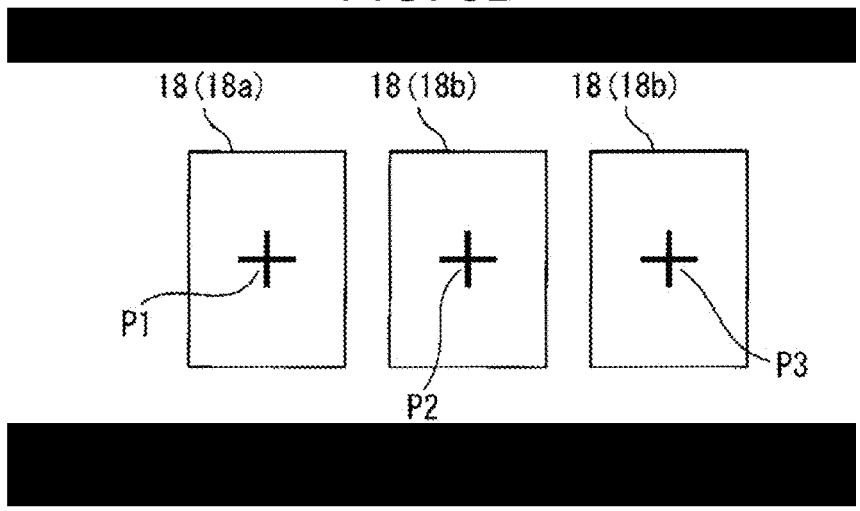
FIG. 3B
FIG. 3C
|    | X  | Y  | R |
|----|----|----|---|
| P1 | X1 | Y1 | 0 |
| P2 | X2 | Y1 | 0 |
| P3 | X3 | Y1 | 0 |

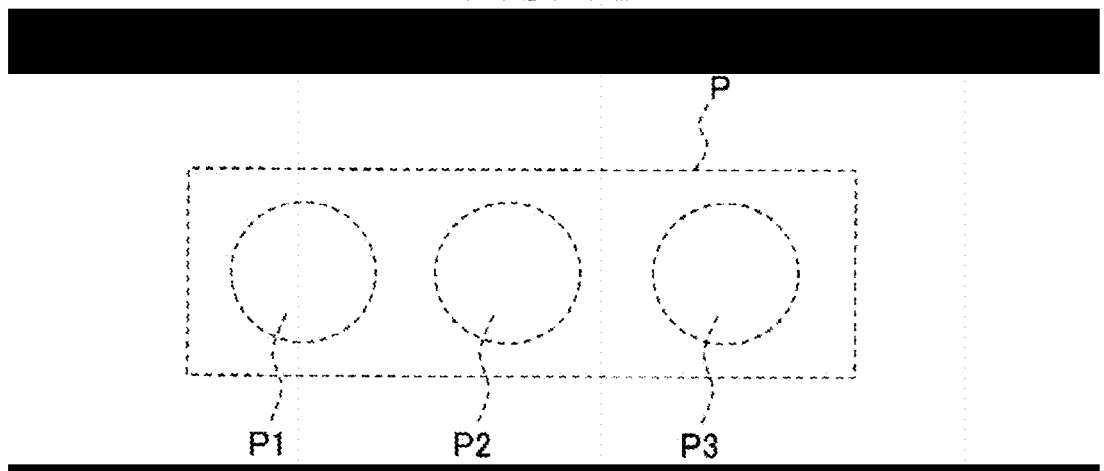
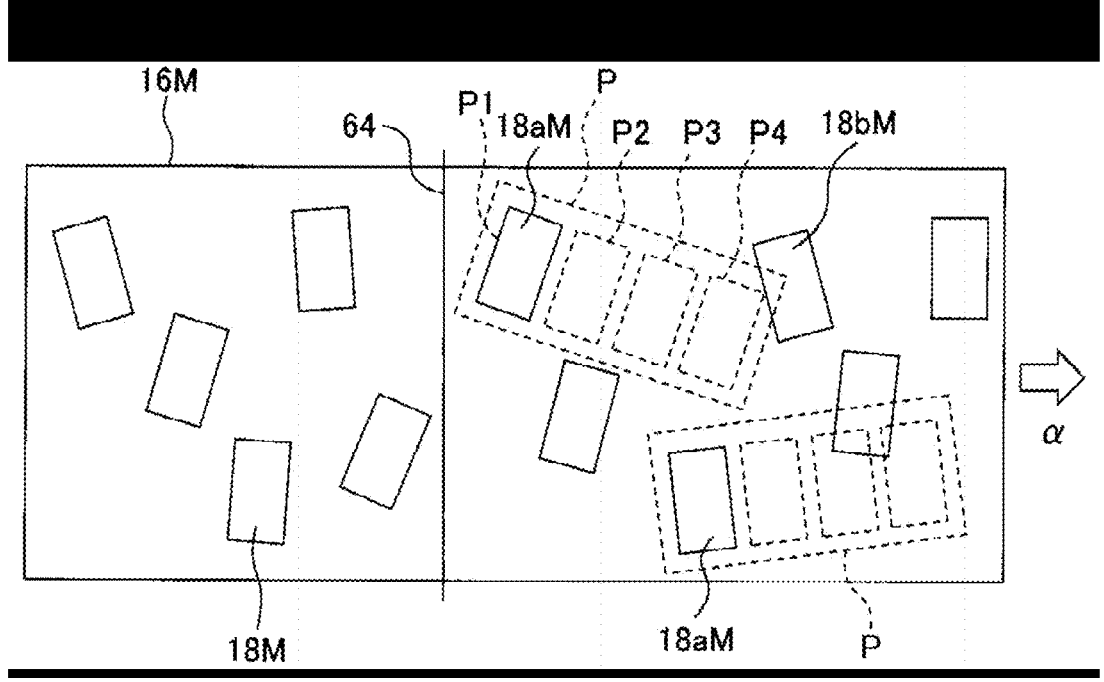

DEVICE, METHOD, PROGRAM AND RECORDING MEDIUM, FOR SIMULATION OF ARTICLE ARRAYING OPERATION PERFORMED BY ROBOT

RELATED APPLICATIONS

The present application claims priority to Japanese Patent Application No. 2016-211940 filed Oct. 28, 2016, the disclosure of which is hereby incorporated by reference herein in its entirety.

BACKGROUND OF THE INVENTION

1. Field of the Invention

The present invention relates to a simulation device and a simulation method, for executing a simulation of an article arraying operation performed by a robot. The present invention also relates to a simulation program usable for executing a simulation of an article arraying operation performed by a robot, and a recording medium on which the simulation program is recorded.

2. Description of the Related Art

A system, in which a vision sensor detects a plurality of articles conveyed by a conveyor and a robot holds and picks up the respective articles while tracking the conveying motion of the conveyor based on the detected position information of the articles, has been known. For example, Japanese Unexamined Patent Publication No. 2015-214012 (JP2015-214012A) describes a system configuration in which a robot operates, while tracking the conveying motion of a conveyor, to pick up each of a plurality of articles placed on the conveyor in a random arrangement and array the articles in a predetermined regular arrangement on the conveyor, based on information detected by a vision sensor and information of the conveying motion of the conveyor. JP2015-214012A also describes a system configuration in which a transfer robot different from the aforementioned robot collectively holds a plurality of articles placed in the regular arrangement on the conveyor and transfers them to another location.

On the other hand, in a production system including a robot for holding an article, a simulation technology in which, in order to verify the validity of an operation program or operation parameters used for making a robot or a peripheral device perform a predetermined operation, a model of the robot or the peripheral device is installed on a computer and a simulation of the predetermined operation is performed on a display screen by moving the model of the robot or the peripheral device in accordance with the operation program, has been known (see, e.g., Japanese Unexamined Patent Publication No. 2010-214556 (JP2010-214556A) and Japanese Unexamined Patent Publication No. 2007-241857 (JP2007-241857A)).

SUMMARY OF THE INVENTION

In the system configuration in which a robot operates while tracking the conveying motion of a conveyor to pick up each of a plurality of articles placed in a random arrangement on the conveyor and array the articles in a regular arrangement, it is desirable to execute a simulation, in a virtual space, of an article arraying operation performed by the robot, so as to make it possible to verify the validity of an operation program or operation parameters in the virtual space and thereby reduce time or cost required for setting up a system.

One aspect of the present disclosure is a simulation device for simulating an article arraying operation performed by a robot, comprising:
 a model locating section configured to locate a conveyor model, a plurality of article models, a sensor model and an arraying robot model in a virtual space, which are prepared respectively by modeling a conveyor, a plurality of articles placed on the conveyor, a sensor detecting the plurality of articles and an arraying robot arraying the plurality of articles on the conveyor;
 a conveying motion simulating section configured to simulate an article conveying motion, the conveyor model moving, by the article conveying motion, to convey the plurality of article models placed in a random arrangement on the conveyor model;
 a detecting motion simulating section configured to simulate an article detecting motion, the sensor model operating, by the article detecting motion, to obtain position information of each of the plurality of article models conveyed in the random arrangement;
 an arrangement pattern generating section configured to generate an arrangement pattern on the conveyor model by using the position information, the arrangement pattern including a plurality of pattern elements in a predetermined regular arrangement, each pattern element representing a position of each of the article models; and
 an arraying motion simulating section configured to simulate an article arraying motion by using information of the article conveying motion and the position information, the arraying robot model moving while tracking the article conveying motion, by the article arraying motion, to pick up each of the article models in the random arrangement and place a picked-up article model in accordance with the arrangement pattern.

The simulation device may have a configuration wherein the model locating section is configured to locate a transfer robot model additionally in the virtual space, which is prepared by modeling a transfer robot collectively transferring the plurality of articles arrayed by the arraying robot; and may further comprise a transferring motion simulating section configured to simulate an article transferring motion by using the information of the article conveying motion, the transfer robot model moving while tracking the article conveying motion, by the article transferring motion, to collectively pick up and transfer the plurality of article models placed in accordance with the arrangement pattern.

Another aspect of the present disclosure is a simulation method for simulating, on a computer, an article arraying operation performed by a robot, the method comprising:
 locating, by a model locating section of the computer, a conveyor model, a plurality of article models, a sensor model and an arraying robot model in a virtual space, which are prepared respectively by modeling a conveyor, a plurality of articles placed on the conveyor, a sensor detecting the plurality of articles and an arraying robot arraying the plurality of articles on the conveyor;
 simulating, by a conveying motion simulating section of the computer, an article conveying motion, the conveyor model moving, by the article conveying motion, to convey the plurality of article models placed in a random arrangement on the conveyor model;
 simulating, by a detecting motion simulating section of the computer, an article detecting motion, the sensor model operating, by the article detecting motion, to obtain position information of each of the plurality of article models conveyed in the random arrangement;

generating, by an arrangement pattern generating section of the computer, an arrangement pattern on the conveyor model by using the position information, the arrangement pattern including a plurality of pattern elements in a predetermined regular arrangement, each pattern element representing a position of each of the article models; and simulating, by an arraying motion simulating section of the computer, an article arraying motion by using information of the article conveying motion and the position information, the arraying robot model moving while tracking the article conveying motion, by the article arraying motion, to pick up each of the article models in the random arrangement and place a picked-up article model in accordance with the arrangement pattern.

Yet another aspect of the present disclosure is a simulation program used for simulating an article arraying operation performed by a robot, the program making a computer function as:

a model locating section configured to locate a conveyor model, a plurality of article models, a sensor model and an arraying robot model in a virtual space, which are prepared respectively by modeling a conveyor, a plurality of articles placed on the conveyor, a sensor detecting the plurality of articles and an arraying robot arraying the plurality of articles on the conveyor;

a conveying motion simulating section configured to simulate an article conveying motion, the conveyor model moving, by the article conveying motion, to convey the plurality of article models placed in a random arrangement on the conveyor model;

a detecting motion simulating section configured to simulate an article detecting motion, the sensor model operating, by the article detecting motion, to obtain position information of each of the plurality of article models conveyed in the random arrangement;

an arrangement pattern generating section configured to generate an arrangement pattern on the conveyor model by using the position information, the arrangement pattern including a plurality of pattern elements in a predetermined regular arrangement, each pattern element representing a position of each of the article models; and an arraying motion simulating section configured to simulate an article arraying motion by using information of the article conveying motion and the position information, the arraying robot model moving while tracking the article conveying motion, by the article arraying motion, to pick up each of the article models in the random arrangement and place a picked-up article model in accordance with the arrangement pattern.

A further aspect of the present disclosure is a computer readable recording medium used for simulating an article arraying operation performed by a robot, the recording medium recording a simulation program making a computer function as:

a model locating section configured to locate a conveyor model, a plurality of article models, a sensor model and an arraying robot model in a virtual space, which are prepared respectively by modeling a conveyor, a plurality of articles placed on the conveyor, a sensor detecting the plurality of articles and an arraying robot arraying the plurality of articles on the conveyor;

a conveying motion simulating section configured to simulate an article conveying motion, the conveyor model moving, by the article conveying motion, to convey the plurality of article models placed in a random arrangement on the conveyor model;

a detecting motion simulating section configured to simulate an article detecting motion, the sensor model operating, by the article detecting motion, to obtain position information of each of the plurality of article models conveyed in the random arrangement;

an arrangement pattern generating section configured to generate an arrangement pattern on the conveyor model by using the position information, the arrangement pattern including a plurality of pattern elements in a predetermined regular arrangement, each pattern element representing a position of each of the article models; and an arraying motion simulating section configured to simulate an article arraying motion by using information of the article conveying motion and the position information, the arraying robot model moving while tracking the article conveying motion, by the article arraying motion, to pick up each of the article models in the random arrangement and place a picked-up article model in accordance with the arrangement pattern.

In the simulation device according to one aspect, the conveying motion simulating section, the detecting motion simulating section, the arrangement pattern generating section and the arraying motion simulating section execute a simulation to make the conveyor model, the sensor model and the arraying robot model, located in the virtual space, simulate the article conveying motion, the article detecting motion and the article arraying motion on the plurality of article models located in the virtual space, so that it is possible to verify, in the virtual space, whether the arraying robot model can operate, while tracking the conveying motion of the conveyor model, to pick up each of the plurality of article models placed in the random arrangement on the conveyor model and array the article models in the predetermined regular arrangement on the conveyor model (i.e., verify the validity of an operation program or operation parameters associated with the article arraying operation of an actual robot system). If a problem is discovered in the article arraying operation simulated by the simulation device, it is possible to appropriately correct the operation program or the operation parameters so as to solve the problem. Additionally, when the configuration of the actual robot system is changed, it is possible for the simulation device to simulate an article arraying operation corresponding to a changed robot system and thereby optimize the operation program or the operation parameters. Thus, according to the simulation device, it is possible to reduce time or cost required for setting up the robot system on a production site.

The simulation method, the simulation program and the recording medium, according to other aspects, can have analogous effects.

BRIEF DESCRIPTION OF THE DRAWINGS

The objects, features and advantages of the present invention will become more apparent from the following description of the embodiments in connection with the accompanying drawings, wherein:

FIG. 1 is a functional block diagram depicting the configuration of a simulation device according to one embodiment;

FIG. 2 is an illustration schematically depicting an exemplary configuration of a robot system subjected to a simulation;

FIG. 3A is an illustration schematically depicting an example of an arrangement pattern;

FIG. 3B is an illustration depicting an example of articles arrayed in accordance with the arrangement pattern;

FIG. 3C is a table depicting an example of an arrangement form defining pattern elements;

FIG. 7B is an illustration depicting another example of an arrangement pattern generated in a virtual space;

FIG. 8A is an illustration depicting the example of the arrangement pattern generated in the virtual space together with an example of article models;

DETAILED DESCRIPTION

Figure 4:
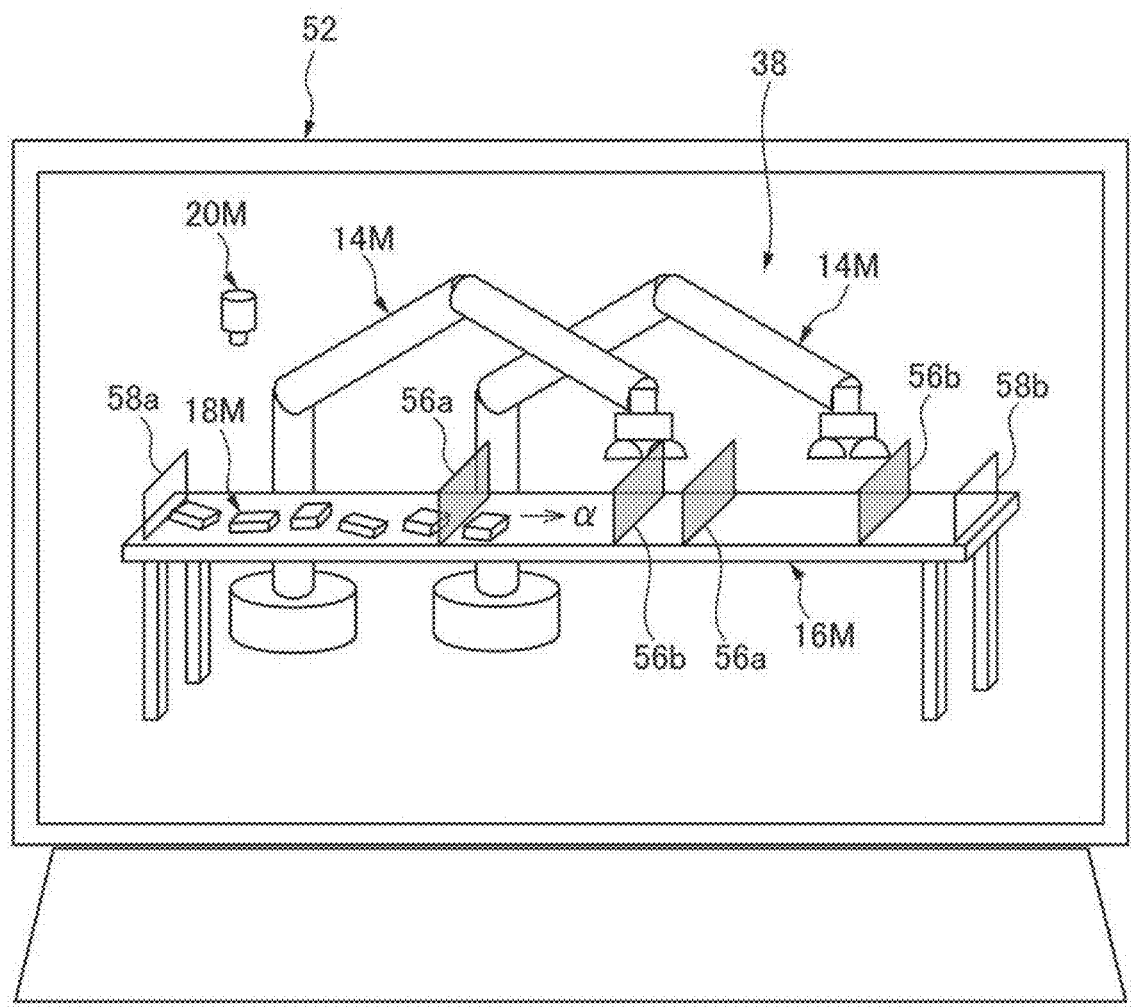
FIG. 4 is an illustration depicting an example of a display unit attachable to a simulation device together with an exemplary recording medium which records a simulation program.

Embodiments of the present disclosure will be described below with reference to the accompanying drawings. Throughout the drawings, corresponding components are denoted by common reference numerals.

FIG. 1 depicts, as a functional block diagram, the basic configuration of a simulation device 10 according to one embodiment. FIG. 2 schematically illustrates an exemplary configuration of a robot system 12 subjected to a simulation executed by the simulation device 10. The simulation device 10 is configured to execute an offline simulation of an article arraying operation performed by a robot 14 of the robot system 12, and may be constituted by, for example, installing a required software on a computer such as a personal computer. The simulation device 10 may also be considered as an offline teaching (or offline programming) device configured to teach the article arraying operation to the robot 14, in terms of functionality.

First, the configuration of the robot system 12 will be summarized. The robot system 12 has a configuration in which the robot 14 operates, while tracking the conveying motion of a conveyor 16, to pick up each of a plurality of articles 18 placed on the conveyor 16 in a random arrangement and array the articles in a predetermined regular arrangement on the conveyor 16, based on information detected by a sensor (e.g., a vision sensor) 20 and information of the conveying motion of the conveyor 16. More specifically, the robot system 12 is provided with the robot 14 configured to hold an article 18, the conveyor 16 configured to convey the article 18, the sensor 20 configured to obtain position information Dp of each of the articles 18 placed on the conveyor 16 in a random arrangement, a conveyor sensor 22 configured to obtain conveying information Dm of the conveyor 16, a control device 24 configured to control the robot 14, and a conveyor control device 26 configured to control the conveyor 16.

The article 18 may be variously shaped and dimensioned. The articles 18 having various shapes and sizes, or the articles 18 having the same shape and size, may be placed in the random arrangement. The "random arrangement" means an arrangement where the articles 18 are randomly arranged and not intended to be arranged in a certain form. More specifically, the random arrangement means that, in a two-dimensional extent (e.g., in an image obtained by the sensor 20) defined when viewing the plurality of articles 18 from directly above, the respective articles 18 take various positions and orientations. On the contrary, the "regular arrangement" means an arrangement wherein the articles 18 are arranged under a predetermined rule, such as in a linear array, a curved array, a zigzag array, an annular array, etc., in the two-dimensional extent. In the regular arrangement, the orientations (or the directions) of the respective articles 18 may be identical to or different from each other, and the distances between the adjacent pairs of articles 18 may be identical to or different from each other. Note that, in the present application, the articles 18 may include various objects, such as an unprocessed workpiece, a processed workpiece, an agricultural product, an industrial product, etc.

The robot 14 may include a mechanical section appropriately selected from various known mechanical sections, such as an articulated type, a gantry type, a parallel link type, etc., and a hand appropriately selected from various known hands, such as a suction type, a gripper type, etc. The robot 14 does not need to have a configuration dedicated for the article arraying operation performed by the robot system 12, and may have a versatile configuration as well as the hand (robot 14 is hereinafter referred to as "arraying robot 14" merely for identification).

The sensor 20 is provided with an image capturing section such as a CCD camera (hereinafter referred to as a camera 28) and an image processing section configured to process data captured by the camera 28. The image processing section may be a dedicated image processor (not depicted) or may be a function of the control device 24 as described later. The camera 28 captures an image of the plurality of articles 18 placed in the random arrangement in a viewing field of the camera 28 from directly above, and the image processing section performs appropriate image processing on the captured image data, so that the sensor 20 detects the existence of the article 18 and obtains information (i.e., three-dimensional data) of position (coordinate value) and orientation (rotational angle) of each article 18 in a predetermined three-dimensional camera coordinate system. The position information Dp obtained by the sensor 20 includes the information of the position and orientation of the article 18. However, in a configuration in which, for example, a suction hand that does not limit a holding position of the articles 18 is attached to the arraying robot 14 and the articles 18 arrayed in the regular arrangement take various orientations, the position information Dp may not include the information of the orientation of the articles 18. The sensor 20 may further obtain information of a two-dimensional outer shape of each article 18 (i.e., shape information Ds) from the image data. Alternatively, the shape information Ds of the articles 18 may be previously inputted into the control device 24 by an operator. Note that the sensor 20 is not limited to a vision sensor having the camera 28, but may be selected from other various known sensors, provided that the position information Dp, and the shape information Ds if necessary, of the article 18 can be obtained by the sensor 20.

The conveyor 16 includes a known convey member capable of supporting the articles 18 and conveying them in one direction (a direction of an arrow a, in the drawing), and a known drive mechanism that continuously or intermittently drives the convey member under the control of the conveyor control device 26. The conveyor sensor 22 may include, for example, an encoder that can detect the position or speed of the convey member or the drive mechanism of the conveyor 16, and obtains the detected position or speed as the conveying information Dm. The arraying robot 14 is disposed at a predetermined position in the lateral side of the conveyor 16, and performs, in a predetermined working space, an article arraying motion with respect to the article 18 conveyed from the upstream side of the conveyor 16 in a manner described later. The camera 28 of the sensor 20 is disposed upstream of the arraying robot 14 in the article conveying direction a, and captures an image of the article 18 and the conveyor 16, existing in a predetermined viewing field 30, from directly above the conveyor 16.

In the exemplary configuration depicted in FIG. 2, the arraying robot 14 includes a first robot 14a and a second robot 14b, which operate independently of each other. The second robot 14b is disposed downstream of the first robot 14a in the article conveying direction a. Corresponding to this, the control device 24 includes a first control device 24a configured to control the first robot 14a and a second control device 24b configured to control the second robot 14b. The first control device 24a and the second control device 24b can communicate data to each other through a network hub 32 and a wired communication cable 34. Note that each of the number of arraying robots 14 and the number of control devices 24, included in the robot system 12, is not limited to two as illustrated and may be one or at least three.

The first control device 24a includes a robot controlling section (not depicted) configured to control the motion of the first robot 14a and an image processing section (not depicted) as a component of the sensor 20. The first control device 24a may also include a camera controlling section (not depicted) configured to control the imaging operation of the camera 28. The second control device 24b includes a robot controlling section configured to control the motion of the second robot 14b. The robot controlling sections of the first and second control devices 24a, 24b are provided with a CPU (central processing unit) that includes a microprocessor configured to execute processing as described later, including the generation of an arrangement pattern, judgment of interference and the generation of an article arraying motion; and an axis control unit configured to control the article arraying motions of the first and second robots 14a, 14b. The conveying information Dm obtained by the conveyor sensor 22 is inputted into the first control device 24a. The first control device 24a can transmit to the second control device 24b, via communication, the inputted conveying information Dm, the position information Dp obtained from the image processing section, and the shape information Ds (known information or obtained information) held in the image processing section.

The robot controlling section of the control device 24 (first and second control devices 24a, 24b) is configured to execute the following process to make the arraying robot 14 (first and second robots 14a, 14b) perform the article arraying operation. First, an arrangement pattern, which includes a plurality of pattern elements that represent positions of the articles 18 arrayed in a predetermined regular arrangement, is virtually generated on the conveyor 16 using the position information Dp so that a first pattern element, which is one of the plurality of pattern elements, aligns with the position of a reference article 18a, which is one of the articles 18 placed in a random arrangement. Next, the shape information Ds and the position information Dp of the articles 18 are used to estimate to predictively judge whether an interference is caused between an article 18b capable of being placed on a second pattern element in the generated arrangement pattern, different from the first pattern element, and another article 18 including the reference article 18a. Then, taking into consideration the judgment result of interference and using the position information Dp, the picking motion of the arraying robot 14 for the arraying robot 14 to pick up the article 18b which is not the reference article 18a while tracking the conveying motion of the conveyor 16 is generated. Next, taking into consideration the judgment result of interference, the arraying operation of the arraying robot 14 for the arraying robot 14 to place the picked up article 18b in a position juxtaposed to the reference article 18a in accordance with the arrangement pattern while tracking the conveying motion of the conveyor 16 is generated. In the present application, the picking motion and the arraying motion performed by the arraying robot 14 are referred to collectively as the article arraying motion.

FIG. 3A schematically illustrates an example of an arrangement pattern P. The arrangement pattern P according to the example in the drawing includes a plurality of (three) pattern elements, i.e. pattern element P1, pattern element P2, and pattern element P3, that represent the positions of the articles 18 arrayed in a predetermined regular arrangement (in the drawing, arrayed in a linear array in the lateral direction). Each of the pattern elements P1, P2, P3 is illustrated by a "+" mark for the sake of easier understanding, but does not need to have any shape. Note that the arrangement pattern P may include two, four or more pattern elements, and may include pattern elements arrayed according to other rules, such as a curved array, a zigzag array, or an annular array.

The arrangement pattern P is generated based on an arrangement form defined by coordinate values of the plurality of pattern elements in a predetermined pattern coordinate system. In the example of FIG. 3A, in a pattern coordinate system 36 set at any position in the camera coordinate system, an arrangement form defined by coordinate values (X1, Y1), (X2, Y1), (X3, Y1) for the pattern elements P1, P2, P3 is prepared. Based on the arrangement form, the arrangement pattern P including the linearly-arrayed pattern elements P1, P2, P3 is virtually generated on the conveyor 16 where the articles 18 are to be arrayed in a regular arrangement. The arraying robot 14 operates to rearrange the articles 18 placed in a random arrangement to a regular arrangement in which the articles are linearly arrayed according to the generated arrangement pattern P while tracking the conveying motion of the conveyor 16. In this connection, one of the articles 18 placed in a random arrangement is taken as the reference article 18*a* (FIG. 2), and the arraying robot 14 operates to place another article 18*b* (FIG. 2) of the articles 18 in a position juxtaposed to the reference article 18*a* without moving the reference article 18*a*.

FIG. 3B illustrates an example of the articles 18 arrayed in a regular arrangement according to the arrangement pattern P of FIG. 3A. In this example, three articles 18 having the same rectangular two-dimensional shape are arranged with the geometrical centers thereof being positioned at three pattern elements P1, P2, P3 of the arrangement pattern P. First, the reference article 18*a* is selected from the articles 18 placed in a random arrangement, and a first pattern element (pattern element P1 on the left end in the drawings) of the plurality of pattern elements defined by the arrangement form (FIG. 3A) is aligned with the position of the reference article 18*a*, so that the other or second pattern elements (pattern element P2 in the center and pattern element P3 on the right end in the drawings) defined by the arrangement form are linearly arrayed with respect to the first pattern element (P1), and consequently the arrangement pattern P is generated. The arraying robot 14 arrays the other articles 18*b* at the second pattern elements (P2, P3) according to the arrangement pattern P. As a result, three articles 18 are arrayed in a regular arrangement according to the arrangement pattern P.

In the example of FIGS. 3A to 3C, the articles 18 are arrayed by positioning or aligning the geometrical center of the two-dimensional shape of each of the articles 18 (18*a*, 18*b*) at each of the pattern elements P1, P2, P3. Alternatively, the articles 18 may be arrayed by positioning or aligning any other portion than the geometrical center (e.g., one apex of the rectangle) at the pattern element, provided that the portion of one article 18 corresponds to that of the other article 18 in view of the shape of the articles 18. For example, an operator may set a portion of the article 18, which is to be positioned at a pattern element, and input the set portion to the control device 24.

In a configuration in which the orientation of the articles 18 is not taken into consideration when the articles 18 are arrayed in a regular arrangement, the plurality of pattern elements P1, P2, P3 included in the arrangement pattern P are only required to represent the position of the articles 18 as described above. In a configuration in which the orientation of the articles 18 is taken into consideration when the articles 18 are arrayed in a regular arrangement, the plurality of pattern elements P1, P2, P3 included in the arrangement pattern P represent both the position and the orientation of the articles 18. In such a configuration, the pattern elements P1, P2, P3 of the arrangement form are defined by coordinate values (X, Y) in the pattern coordinate system 36 and a relative rotational angle R.

FIG. 3C is a table illustrating an example of the arrangement form that defines the pattern elements P1, P2, P3 of FIG. 3A. In the arrangement form depicted in FIG. 3C, the pattern elements P1, P2, P3 are defined by coordinate values (X, Y) ((X1, Y1), (X2, Y1), (X3, Y1)) and a relative rotational angle R (0°, 0°, 0°). The relative rotational angle R is defined as the angle of the other pattern elements P2, P3 relative to the angle of the pattern element P1 set as a reference (i.e., 0°).

The arrangement pattern P that includes the pattern elements P1, P2, P3 that define the arrangement form is the pattern which the arraying robot 14 linearly arrays three of the articles 18 (in the X-axis direction of the pattern coordinate system 36) with the three all having the same orientation facing the 0° direction (e.g., the positive direction of the Y-axis of the pattern coordinate system 36) (see FIG. 3B). Note that the coordinate values (X, Y) that define the pattern elements P1, P2, P3 and the relative rotational angle R according to the target array configuration of the articles 18 can, for example, be inputted into the control device 24 by the operator.

The robot controlling section of the control device 24 (first and second control devices 24*a*, 24*b*) uses the shape information Ds of the articles 18 and the position information Dp of the articles 18 obtained by the sensor 20 to predictively judge as to whether an interference is caused between the article 18*b* capable of being placed on the second pattern element described above in the arrangement pattern P, and the other articles 18 including the reference article 18*a*. The shape information Ds may be known information previously provided to the sensor 20 for the detection of the articles 18, or information obtained by the sensor 20 from actual image data. It may be defined that the "interference" means a situation where two articles 18 placed on site overlap with each other, but does not mean a situation where, for example, the two articles 18 come into static contact with each other on the lateral surfaces thereof. Alternatively, the "interference" may include such a statically contacting situation. As for the shape information Ds, information of an actual shape may be used if the article 18 has a simple two-dimensional shape, such as a circle or a rectangle. If the two-dimensional outer shape of the article 18 is not simple, an actual shape may be converted into a simple shape so as to obtain the shape information Ds.

The robot controlling section of the control device 24 (first and second control devices 24*a*, 24*b*), in generating the arrangement pattern P on the conveyor 16, can select one from the articles 18 placed in a random arrangement to be the reference article 18*a* while taking into consideration the judgment result of interference. For example, when selecting the reference article 18*a*, some of the plurality of articles 18 placed in the random arrangement are first selected as reference candidates, and the aforementioned judgment of interference is performed by sequentially using the reference candidates one by one as a provisional reference article Ma. At a time when one reference candidate, permitting the arrangement pattern P to be generated with no interference caused between the articles 18, is found, it is possible to generate the arrangement pattern P with use of the reference candidate as a proper reference article 18*a*.

The robot controlling section of the control device 24 (first and second control devices 24*a*, 24*b*) uses the position information Dp of the articles 18 obtained by the sensor 20 to generate the picking motion for the arraying robot 14 (first and second robots 14*a*, 14*b*) to pick up the article 18*b*, which is an article 18 excluding the reference article 18*a* placed in a random arrangement.

In this connection, by taking into consideration the judgment result of interference, a picking motion that results in an efficient arraying operation can be generated. Additionally, the robot controlling section of the control device 24 (first and second control devices 24*a*, 24*b*) generates the arraying operation for the arraying robot 14 (first and second robots 14*a*, 14*b*) to place the picked up article 18*b* in a position juxtaposed to the reference article 18*a* in accordance with the arrangement pattern P. In this connection, by taking into consideration the judgment result of interference, an arraying operation that results in an efficient arraying operation can be generated.

For example, in a configuration in which the arrangement pattern P depicted in FIG. 3A is generated on site and the articles 18 are arrayed in the form depicted in FIG. 3B, the arrangement pattern P is generated under the premise that the other pattern elements P2, P3 are placed in a position juxtaposed to the articles 18a (aligned with the pattern element P1) at a where there is no interference between the articles 18. In a state where the articles 18 are randomly arranged, if an article 18b exists at a position where an interference may be caused when another article is placed on the pattern element P2, the robot 14 first picks up the article 18b, so as to avoid the predicted interference, and thereafter places the picked-up article 18b to coincide with the pattern element P2 or P3 causing no interference between the articles, so that it is possible to efficiently perform the arraying operation.

The axis controlling section of the control device 24 (first and second control devices 24a, 24b) controls the article arraying motion described above of the arraying robot 14 (first and second robots 14a, 14b) to follow the conveying motion of the conveyor 16, so as to make the arraying robot 14 efficiently array the articles 18 including the reference article 18a in the regular arrangement on the conveyor 16 during the conveying motion. In a system configuration that includes a plurality of arraying robots 14 (first and second robots 14a, 14b), the corresponding control devices 24 (first and second control devices 24a, 24b) can control the arraying robots 14 according to a ratio of operation set, as necessary, depending on how the work of the arraying robots 14 to perform the article arraying motion on the articles 18 is to be shared. The ratio of operation can be inputted into the control device 24 by an operator beforehand. Additionally, the information of the position information Dp and the arrangement pattern P of the articles 18 held by the control device 24 (first control device 24a) configured to control the upstream arraying robot 14 (first robot 14a) is appropriately transmitted to the control device 24 (second control device 24b) configured to control the downstream arraying robot 14 (second robot 14b).

The robot system 12 may have a configuration in which, instead of arraying the articles 18 in a two-dimensional regular arrangement as describe above, the articles 18 are arrayed on top of each other in a three-dimensional regular arrangement. In such a configuration, the robot controlling section of the control device 24 (first and second control devices 24a, 24b) generates an article arraying motion of the arraying robot 14 without judging the interference between articles 18 and without taking interference into consideration.

The above-described article arraying operation in the robot system 12 is executed according to a predetermined operation program describing motion commands for the arraying robot 14, the conveyor 16 and the sensor 20. For example, a host controller (not depicted) configured to integrally control the control device 24 and the conveyor control device 26, may provide the control device 24 and the conveyor control device 26 with the motion command written in the operation program. Various operation parameters inputted into the control device 24 as necessary by the operator may be added to the operation program.

Next, referring to FIGS. 1 to 9, the configuration of the simulation device 10 for simulating the aforementioned article arraying operation performed by the arraying robot 14 in the robot system 12 will be described. As depicted in FIG. 1, the simulation device 10 is provided with a model locating section 40 and a motion simulating section 42. The model locating section 40 is configured to locate a conveyor model 16M, a plurality of article models 18M, a sensor model 20M and an arraying robot model 14M in a virtual space 38 (FIG. 4), which are prepared respectively by modeling the conveyor 16, the plurality of articles 18 placed on the conveyor 16, the sensor 20 detecting the articles 18 and the arraying robot 14 arraying the plurality of articles 18 on the conveyor 16, each of which is a component of the robot system 12. The motion simulating section 42 is configured to make the conveyor model 16M, the sensor model 20M and the arraying robot model 14M, located in the virtual space 38, simulate the article conveying motion, the article detecting motion and the article arraying motion, with respect to the plurality of article models 18M located in the virtual space 38.

More specifically, the motion simulating section 42 includes a conveying motion simulating section 44, a detecting motion simulating section 46, an arrangement pattern generating section 48 and an arraying motion simulating section 50. The conveying motion simulating section 44 is configured to simulate the article conveying motion, so that the conveyor model 16M moves, by the article conveying motion, to convey the plurality of article models 18M placed in a random arrangement on the conveyor model 16M. The detecting motion simulating section 46 is configured to simulate the article detecting motion, so that the sensor model 20M operates, by the article detecting motion, to obtain the position information Dp of each of the plurality of article models 18M conveyed in the random arrangement. The arrangement pattern generating section 48 is configured to generate the arrangement pattern P on the conveyor model 16M by using the position information Dp, in which the arrangement pattern P includes a plurality of pattern elements in a predetermined regular arrangement, each pattern element representing a position of each of the article models 18M. The arraying motion simulating section 50 is configured to simulate the article arraying motion by using the information of the article conveying motion (i.e., conveying information Dm) and the position information Dp, so that the arraying robot model 14M moves while tracking the article conveying motion, by the article arraying motion, to pick up each of the article models 18M in the random arrangement and place a picked-up article model 18M in accordance with the arrangement pattern P.

As previously described, the simulation device 10 can be constituted by a computer, such as a personal computer, installed with the required software, and the model locating section 40 and the motion simulating section 42 (the conveying motion simulating section 44, the detecting motion simulating section 46, the arrangement pattern generating section 48 and the arraying motion simulating section 50) may be embodied as functions added to the computer via an application software. The simulation device 10 can be provided with a display unit, such as a liquid crystal display (LCD), and an input device, such as a keyboard or a mouse (not depicted).

FIG. 4 illustrates an example of a display unit 52 able to be provided to the simulation device 10. The display unit 52 displays model images of the virtual space 38 created by the model locating section 40, and displays the model images of the article conveying motion, the article detecting motion, and the article arraying motion executed by the motion simulating section 42 as animations. The model images may be created by the simulation device 10 provided with designing functions such as computer assisted design (CAD), or alternatively, image data created by an external device provided with designing functions such as CAD can be entered into the simulation device 10 and used. The operator, while referring to the screen of the display unit 52, can verify the validity of the operation of the models and input required operation parameters via an input device (not depicted).

FIG. 4 also depicts an example of a recording medium 54 which records a simulation program making a computer function as the simulation device 10. The simulation program will be described below.

Figure 5:
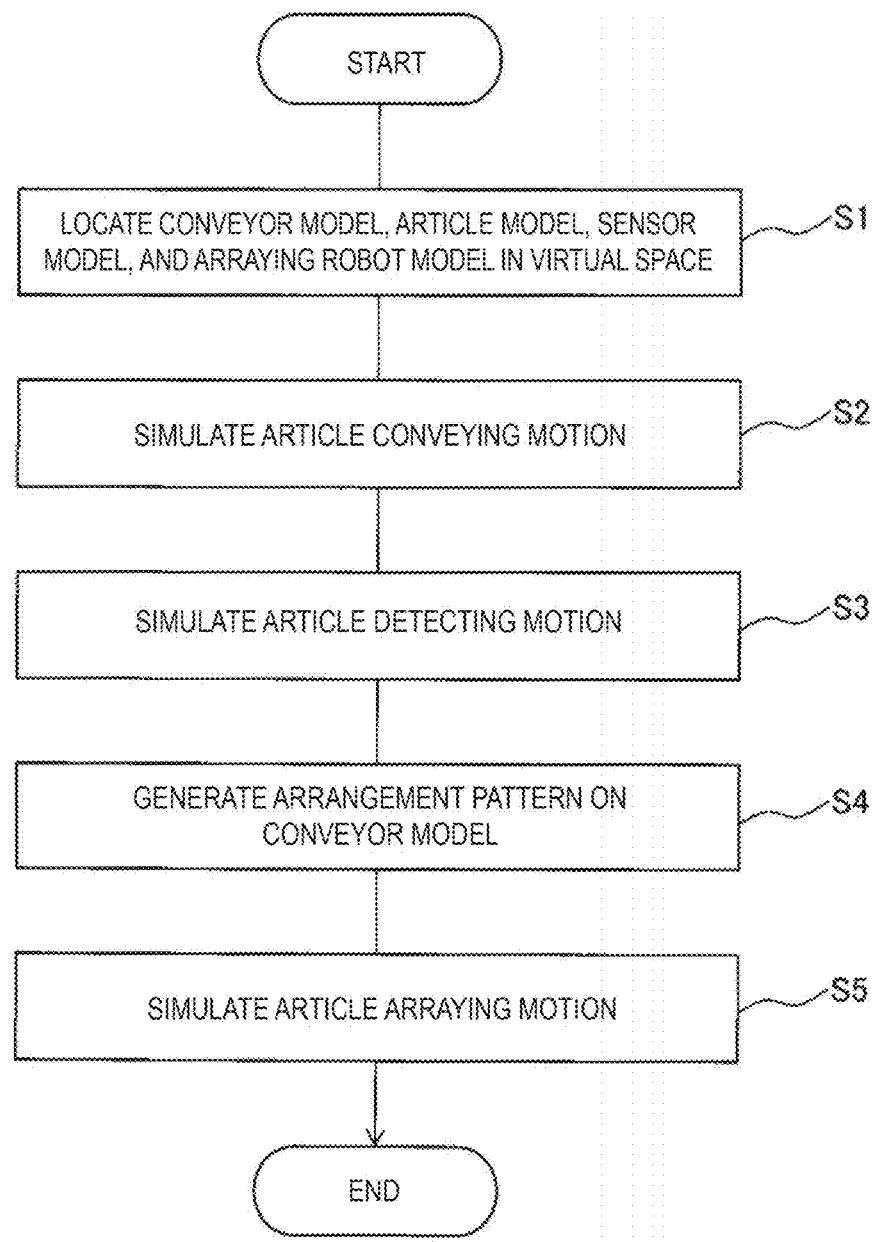
FIG. 5 is a flowchart explaining a simulation method according to one embodiment.

FIG. 5 is a flowchart depicting a simulation method according to one embodiment, which is executed by the simulation device 10. The simulation method has a configuration for simulating, on a computer, the article arraying operation performed by the arraying robot 14, and includes following steps S1 to S5.

Step S1: The model locating section 40 of the computer locates the conveyor model 16M, the plurality of article models 18M, the sensor model 20M and the arraying robot model 14M in the virtual space 38, which are prepared respectively by modeling the conveyor 16, the plurality of articles 18 placed on the conveyor 16, the sensor 20 detecting the articles 18 and the arraying robot 14 arraying the plurality of articles 18 on the conveyor 16.

Step S2: The conveying motion simulating section 44 of the computer simulates the article conveying motion, the conveyor model 16M moving, by the article conveying motion, to convey the plurality of article models 18M placed in the random arrangement on the conveyor model 16M.

Step S3: The detecting motion simulating section 46 of the computer simulates the article detecting motion, the sensor model 20M operating, by the article detecting motion, to obtain the position information Dp of each of the plurality of article models 18M conveyed in the random arrangement.

Step S4: The arrangement pattern generating section 48 of the computer generates the arrangement pattern P on the conveyor model 16M by using the position information Dp, the arrangement pattern P including the plurality of pattern elements in a predetermined regular arrangement, each pattern element representing the position of each of the article models 18M.

Step S5: The arraying motion simulating section 50 of the computer simulates the article arraying motion by using the conveying information Dm and the position information Dp, the arraying robot model 14M moving while tracking the article conveying motion, by the article arraying motion, to pick up each of the article models 18M in the random arrangement and place the picked-up article model 18M in accordance with the arrangement pattern P.

Referring to FIG. 4, an example of a model layout in the virtual space 38 created by the model locating section 40 in step S1 is displayed on the screen of the display unit 52. The model layout includes the long table-like conveyor model 16M, the rectangular box-like article models 18M placed in a random arrangement on the upper surface of the conveyor model 16M, the two arraying robot models 14M disposed side by side in the article conveying direction a at a lateral side of the conveyor model 16M, and the sensor model 20M disposed above the conveyor model 16M at a position upstream of the arraying robot models 14M in the article conveying direction a.

Each arraying robot model 14M includes a vertical articulated type mechanical section and a suction hand attached to the distal end of the mechanical section. The mechanical configuration of the arraying robot models 14M or the conveyor model 16M, or the shape of the article models 18M, may be selected, for example, by an operator from various types of arraying robot models 14M, conveyor models 16M and article models 18M, stored beforehand in a storage section of the simulation device 10 (computer) or an exterior storage device so as to correspond to the mechanical configuration or the shape in the actual robot system 12.

In the model layout of FIG. 4, pairs of working space boundaries 56a, 56b, each pair of which designates the working space (in other words, the range of tracking operation) of each arraying robot model 14M, and a pair of conveyance region boundaries 58a, 58b, which designates the conveyable region of the article model 18M on the conveyor model 16M, are depicted. The operator can appropriately set or change the position of each arraying robot model 14M, the position of the conveyor model 16M, the position of each article model 18M, the position of the sensor model 20M, the position of the working space boundaries 56a, 56b, and the position of the conveyance region boundaries 58a, 58b, by, for example, inputting numerical values using an input device or performing a drag operation on the screen.

The simulation device 10 executes a simulation of the article arraying operation by performing data processing which is essentially identical to the data processing of the actual robot system 12. Accordingly, the arraying robot model 14M, the conveyor model 16M, the article models 18M and the sensor model 20M, provided in the simulation device 10, are three-dimensional models, and the image data of these models displayed on the display unit 52 are three-dimensional image data.

Additionally, in the virtual space 38, a three-dimensional coordinate system is established to facilitate the execution of the simulation of the article arraying operation. In the simulation, a plurality of coordinate systems (e.g., a robot coordinate system, a conveyor coordinate system, a camera coordinate system, etc.) respectively corresponding to various components may be employed analogously to the actual robot system 12, or alternatively a coordinate system common to all components may be employed.

After the model locating section 40 locates the arraying robot models 14M, the conveyor model 16M, the article models 18M and the sensor model 20M in the virtual space 38, the motion simulating section 42 initiates the simulation of the article conveying motion, the article detecting motion and the article arraying motion, according to an operation program 60 and operation parameter 62 (FIG. 1) applied to the actual robot system 12. First, in step S2 (FIG. 5), the conveying motion simulating section 44 executes the simulation of the article conveying motion to create the article models 18M one at a time on the conveyor model 16M near the upstream-side conveyance region boundary 58a so as to be placed in a random arrangement, and move the article models 18M sequentially in the article conveying direction a. In this connection, the operator can set, as the operation parameter 62, the moving speed and conveying amount of the article models 18M, the distance between mutually adjacent article models 18M, the offset amount of each article model 18M from a predetermined reference position, etc., using an input device. For the moving speed and conveying amount of the article models 18M, parameters employed in the actual robot system 12 may also be used. The distance between the article models 18M and the offset amount can be appropriately set by the operator while taking into consideration various possible random arrangements that can be supposed in the actual robot system 12. The moving speed of the article models 18M is, for example, stored in the storage section of the simulation device 10 (or computer) as the conveying information Dm of the conveyor model 16M.

Next, in step S3 (FIG. 5), the detecting motion simulating section 46 executes the simulation of the article detecting motion to make the sensor model 20M capture the image of the article models 18M moving in the article conveying direction a from directly above in a simulative manner, and thereby obtains the image data of the article models 18M and the conveyor model 16M, existing in the viewing field of the sensor model 20M, in a simulative manner. The image data can be obtained by performing a predetermined calculation on the three-dimensional data of the article models 18M and the conveyor model 16M, based on the viewing field and sight direction of the camera virtually provided on the sensor model 20M, the positional relationship between the sensor model 20M and the conveyor model 16M, the positional relationship between the article models 18M, etc. In this connection, the operator can set, as the operation parameter 62, the viewing field and sight direction of the sensor model 20M using an input device. The data of the position (including the distance and offset amount) and shape of the article model 18M used when the image data of the article model 18M and the conveyor model 16M are obtained, is stored, for example, in a storage section of the simulation device 10 (or the computer) as the position information Dp and shape information Ds of the article model 18M.

Figure 6:
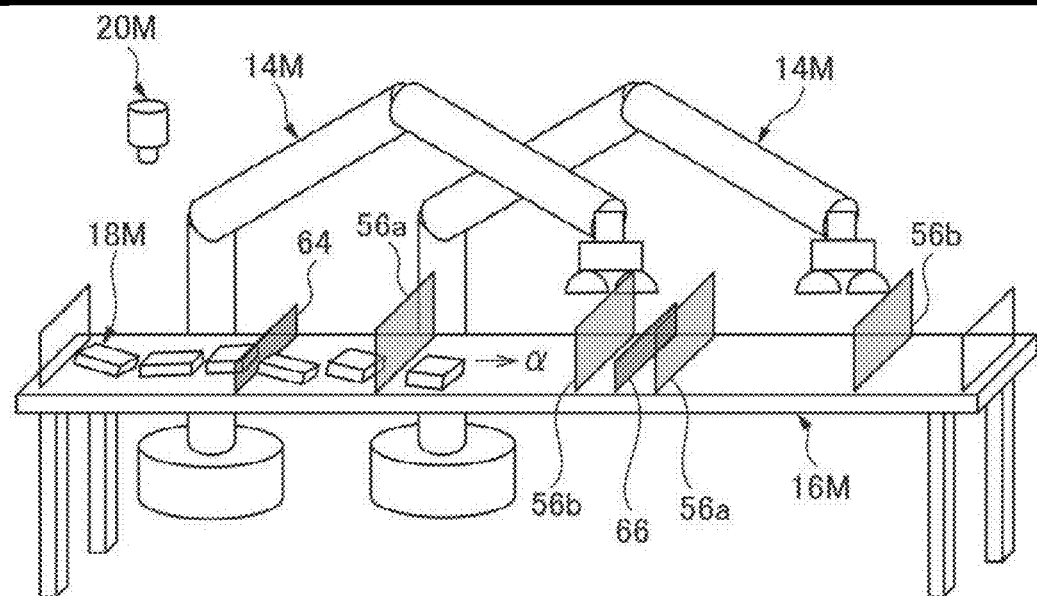
FIG. 6 is an illustration explaining a simulation method according to one embodiment and depicting models located in a virtual space.

Next, in step S4 (FIG. 5), the arrangement pattern generating section 48 generates the arrangement pattern P on the upper surface of the conveyor model 16M, as a preliminary operation for the arraying motion simulating section 50 executing the simulation of the article arraying motion. In this connection, the operator can set a point where the generation of the arrangement pattern P is executed on the conveyor model 16M. FIG. 6 illustrates an example of the model layout of FIG. 4 further including an arrangement pattern-generation executing point 64 located downstream of the sensor model 20M and upstream of the working space boundary 56a. The operator can appropriately set or change the arrangement pattern-generation executing point 64 by, for example, inputting numerical values using an input device or performing a drag operation on the screen.

The arrangement pattern generating section 48 first receives, when generating the arrangement pattern P, the input of setting of the arrangement pattern P located in the virtual space 38. The arrangement pattern P is the same as the arrangement pattern P employed in the actual robot system 12 as depicted, for example, in FIG. 3A, and the operator can set through an input device the arrangement pattern P by using, as the operation parameter 62, the arrangement form as depicted, for example, in FIG. 3C. The arrangement pattern generating section 48 can generate the arrangement pattern P in the form of dashed lines representing the shape of the objective article models 18M, in accordance with the set arrangement pattern P, and display it on the display unit 52, as depicted in, for example, FIGS. 7A and 7B. The arrangement pattern P of FIG. 7A corresponds to the rectangular article models 18M and is generated using the position and orientation data of the article models 18M.

Figure 7A:
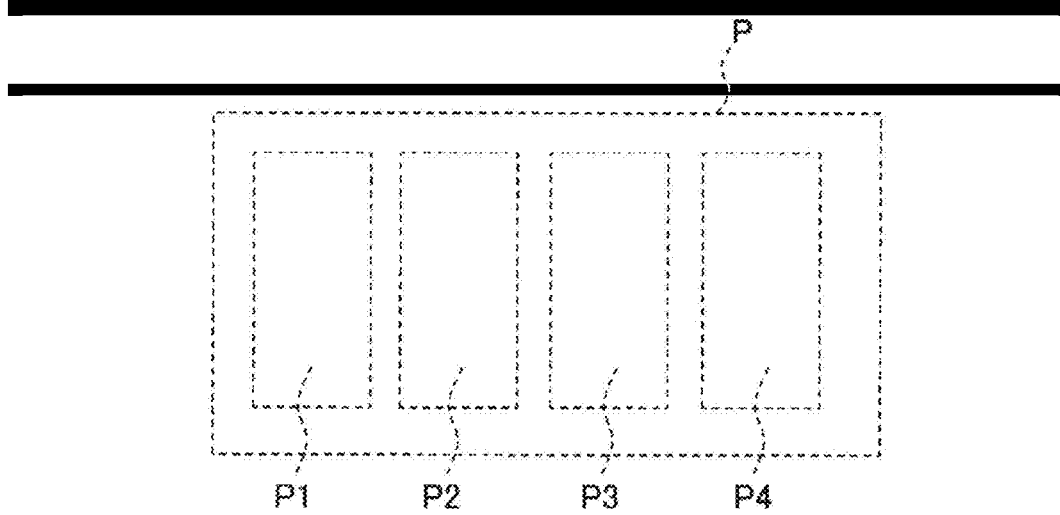
FIG. 7A is an illustration depicting one example of an arrangement pattern generated in a virtual space.

The arrangement pattern P of FIG. 7A includes four pattern elements P1, P2, P3 and P4, each of which represents the position and orientation of the article model 18M, in a predetermined regular arrangement (in the drawing, linearly arrayed in a horizontal direction). The arrangement pattern P of FIG. 7B corresponds to the circular article models 18M and is generated using only the position data of the article models 18M. The arrangement pattern P of FIG. 7B includes three pattern elements P1, P2 and P3, each of which represents the position of the article model 18M, in a predetermined regular arrangement (in the drawing, linearly arrayed in a horizontal direction).

Figure 8B:
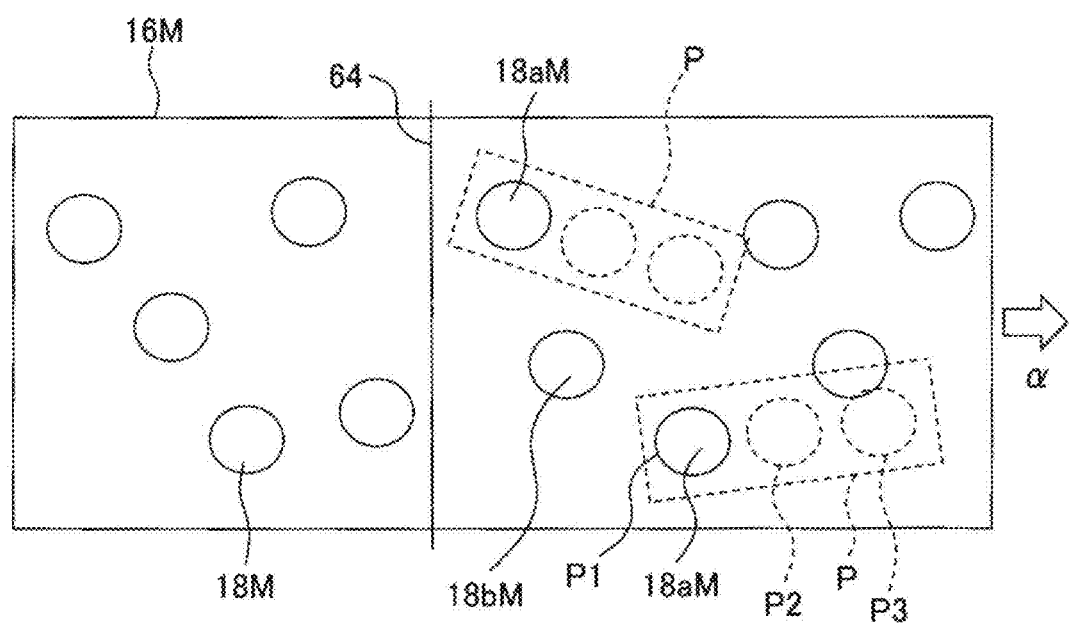
FIG. 8B is an illustration depicting the other example of the arrangement pattern generated in the virtual space together with the other example of article models.

The arrangement pattern generating section 48 can generate the arrangement pattern P on the upper surface of the conveyor model 16M via a process similar to the aforementioned process executed in the actual robot system 12. As depicted in FIG. 8A, for example, when a desired number of rectangular article models 18M pass through the arrangement pattern-generation executing point 64, the arrangement pattern generating section 48 selects, while taking into consideration interference between the article models 18M, a reference article model 18aM from among the article models 18M passed through the arrangement pattern-generation executing point 64, and generates the arrangement pattern P of FIG. 7A on the basis of the reference article model 18aM. In the example of FIG. 8A, the arrangement pattern generating section 48 generates the arrangement pattern P in such a manner that the first pattern element P1, which is any one of the pattern elements P1, P2, P3, P4, coincides with the position of the reference article model 18aM, which is any one of the article models 18M placed in the random arrangement. Analogously, as depicted in FIG. 8B, when a desired number of circular article models 18M pass through the arrangement pattern-generation executing point 64, the arrangement pattern generating section 48 selects, while taking into consideration interference between the article models 18M, a reference article model 18aM from among the article models 18M passed through the arrangement pattern-generation executing point 64, and generates the arrangement pattern P of FIG. 7B on the basis of the reference article model 18aM. In the example of FIG. 8B, the arrangement pattern generating section 48 generates the arrangement pattern P in such a manner that the first pattern element P1, which is any one of the pattern elements P1, P2, P3, coincides with the position of the reference article model 18aM, which is any one of the article models 18M placed in the random arrangement.

Figure 8C:
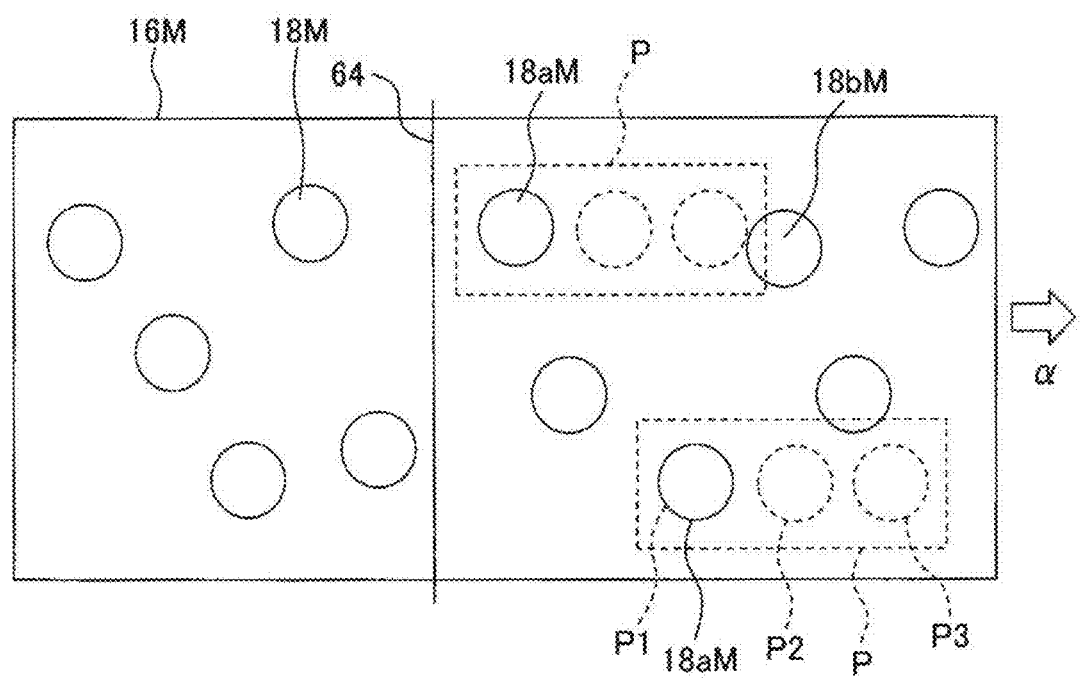
FIG. 8C is an illustration depicting the other example of the arrangement pattern generated in the virtual space together with the other example of article models.

The arrangement pattern generating section 48 can selectively display the arrangement pattern P generated on the upper surface of the conveyor model 16M, on the display unit 52 together with the article models 18M, as a two-dimensional image (as plan views of FIGS. 8A to 8C) different from the image of the model layout. As for the circular article models 18M, the operator may set by an input device whether the arranging direction of the pattern elements included in the arrangement pattern P is set in parallel to the article conveying direction a or not. FIG. 8B illustrates the arrangement pattern P when the arranging direction of the pattern elements P1 to P3 is set in non-parallel to the article conveying direction a. FIG. 8C illustrates the arrangement pattern P when the arranging direction of the pattern elements P1 to P3 is set in parallel to the article conveying direction a.

Next, in step S5 (FIG. 5), the arraying motion simulating section 50 executes the simulation of the article arraying motion to generate the article arraying motion in which each of the arraying robot models 14M moves, within its working space (between the working space boundaries 56a, 56b), to pick up the article model 18M other than the reference article model 18aM and place the picked-up article model 18M at a position juxtaposed to the reference article model 18aM in accordance with the arrangement pattern P, relative to the plurality of article models 18M moving in the article conveying direction a along the upper surface of the conveyor model 16M, while taking into consideration the judgment result of the interference between the article models 18M. The arraying motion simulating section 50 can generate the article arraying motion of each arraying robot model 14M through a process similar to the aforementioned process executed in the actual robot system 12.

In the simulation of the article arraying motion, the operator can set a point on the conveyor model 16M, where the upstream-side arraying robot model 14M virtually sends the position information Dp of the article model 18M or the information of the arrangement pattern P to the downstream-side arraying robot model 14M. In the model layout depicted in FIG. 6, an information transmission executing point 66 located between the downstream-side working space boundary 56b of the upstream-side arraying robot model 14M and the upstream-side working space boundary 56a of the downstream-side arraying robot model 14M is additionally displayed. The operator can appropriately set or change the information transmission executing point 66 by, for example, inputting numerical values using an input device or performing a drag operation on the screen.

Additionally, the operator can set the ratio of operation by an input device, as necessary, which depends on how the work of two arraying robot models 14M to perform the article arraying motion on the article models 18M is to be shared. The parameter employed in the actual robot system 12 can be used as the ratio of operation.

Figure 9:
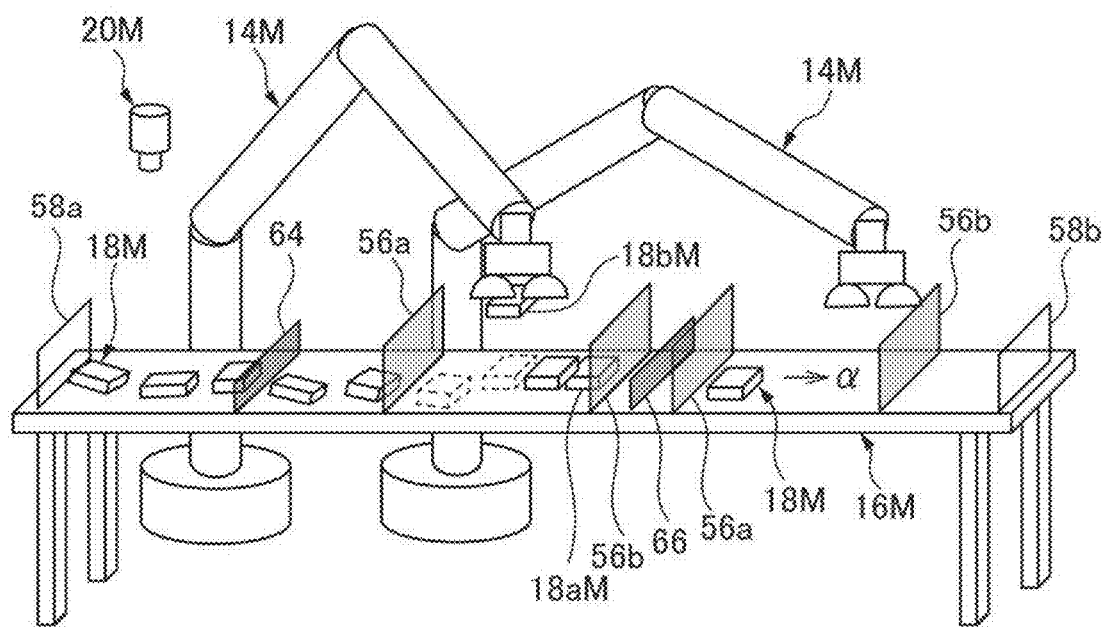
FIG. 9 is an illustration explaining a simulation method according to one embodiment and depicting a state during execution of an article arraying motion.

FIG. 9 illustrates the model layout of FIG. 6 in a state in which the two arraying robot models 14M are performing the article arraying motion. The arraying motion simulating section 50 first generates the article arraying motion for the upstream arraying robot model 14M to be performed on the article models 18M placed in a random arrangement moving in the article conveying direction a, and makes the upstream arraying robot model 14M (mechanical section and hand) perform the article arraying motion. In this connection, the arraying motion simulating section 50 can use the shape information Ds and position information Dp of each of the article models 18M to estimate and predictively judge whether an interference is caused between an article model 18bM capable of being placed on a second pattern element P2, P3, . . . , other than the first pattern element P1, in the arrangement pattern P generated on the upper surface of the conveyor model 16M, and the other article models 18M including the reference article model 18aM, and perform the simulation of the article arraying motion while taking into consideration the judgment result of interference (FIGS. 8A to 8C).

Next, when the article model 18M or the arrangement pattern P, located most downstream, passes through the information transmission executing point 66, the arraying motion simulating section 50 makes the position information Dp of the article models 18M or the information of the arrangement pattern P to be virtually sent from the upstream arraying robot model 14M to the downstream arraying robot model 14M. Then, the arraying motion simulating section 50 generates the article arraying motion for the downstream arraying robot model 14M to be performed on the article models 18M unarrayed by the upstream arraying robot model 14M and moving in the article conveying direction a still placed in a random arrangement, and makes the downstream arraying robot model 14M (mechanical section and hand) perform the article arraying motion while taking into consideration the judgment result of interference in a similar manner. The arraying motion simulating section 50 can make the two arraying robot models 14M perform the article arraying motion in a predetermined sharing ratio according to the ratio of operation set as necessary. If the actual robot system 12 includes only one arraying robot 14, only one arraying robot model 14M is located in the virtual space 38 and the information transmission executing point 66 is not provided.

In the simulation device 10 having the above configuration, the motion simulating section 42 (the conveying motion simulating section 44, the detecting motion simulating section 46, the arrangement pattern generating section 48 and the arraying motion simulating section 50) execute a simulation to make the conveyor model 16M, the sensor model 20M and the arraying robot model 14M, located in the virtual space 38, simulate the article conveying motion, the article detecting motion and the article arraying motion on the article models 18M located in the virtual space 38, in accordance with the operation program 60 and the various operation parameters 62, so that it is possible to verify, in the virtual space 38, whether the arraying robot model 14M can operate, while tracking the conveying motion of the conveyor model 16M, to pick up each of the article models 18M placed in the random arrangement on the conveyor model 16M and array the article models 18M in the predetermined regular arrangement on the conveyor model 16M (i.e., verify the validity of the operation program 60 and the operation parameters 62 associated with the article arraying operation of the actual robot system 12). If a problem is discovered in the article arraying operation simulated by the simulation device 10, it is possible to appropriately correct the operation program 60 or the operation parameters 62 so as to solve the problem. Additionally, when the configuration of the actual robot system 12 is changed, it is possible for the simulation device 10 to simulate an article arraying operation corresponding to the changed robot system 12 and thereby optimize the operation program 60 or the operation parameters 62. Thus, according to the simulation device 10, it is possible to reduce time or cost required for setting up the robot system 12 on a production site of.

Figure 10:
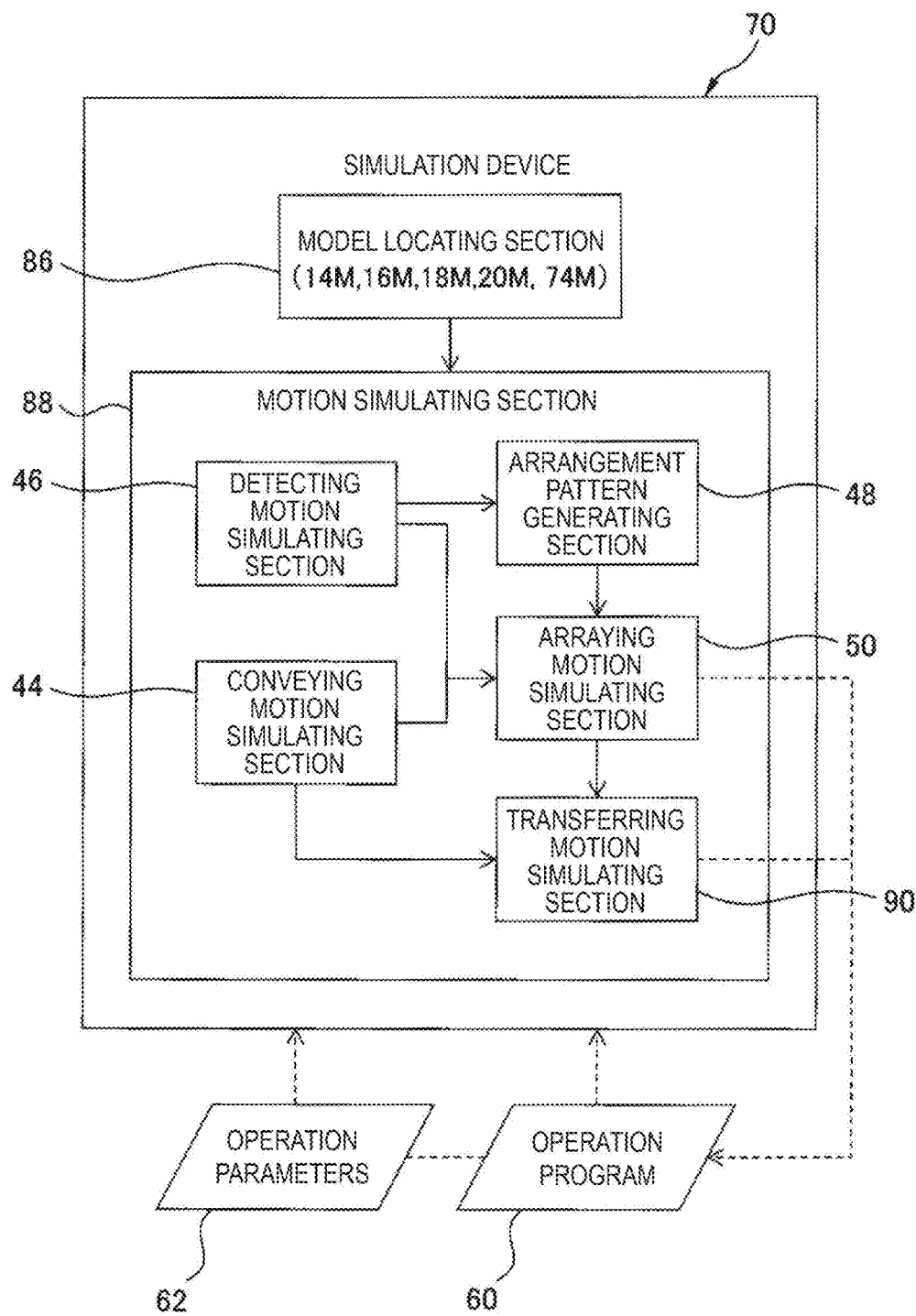
FIG. 10 is a functional block diagram depicting the configuration of a simulation device according to another embodiment.
Figure 11:
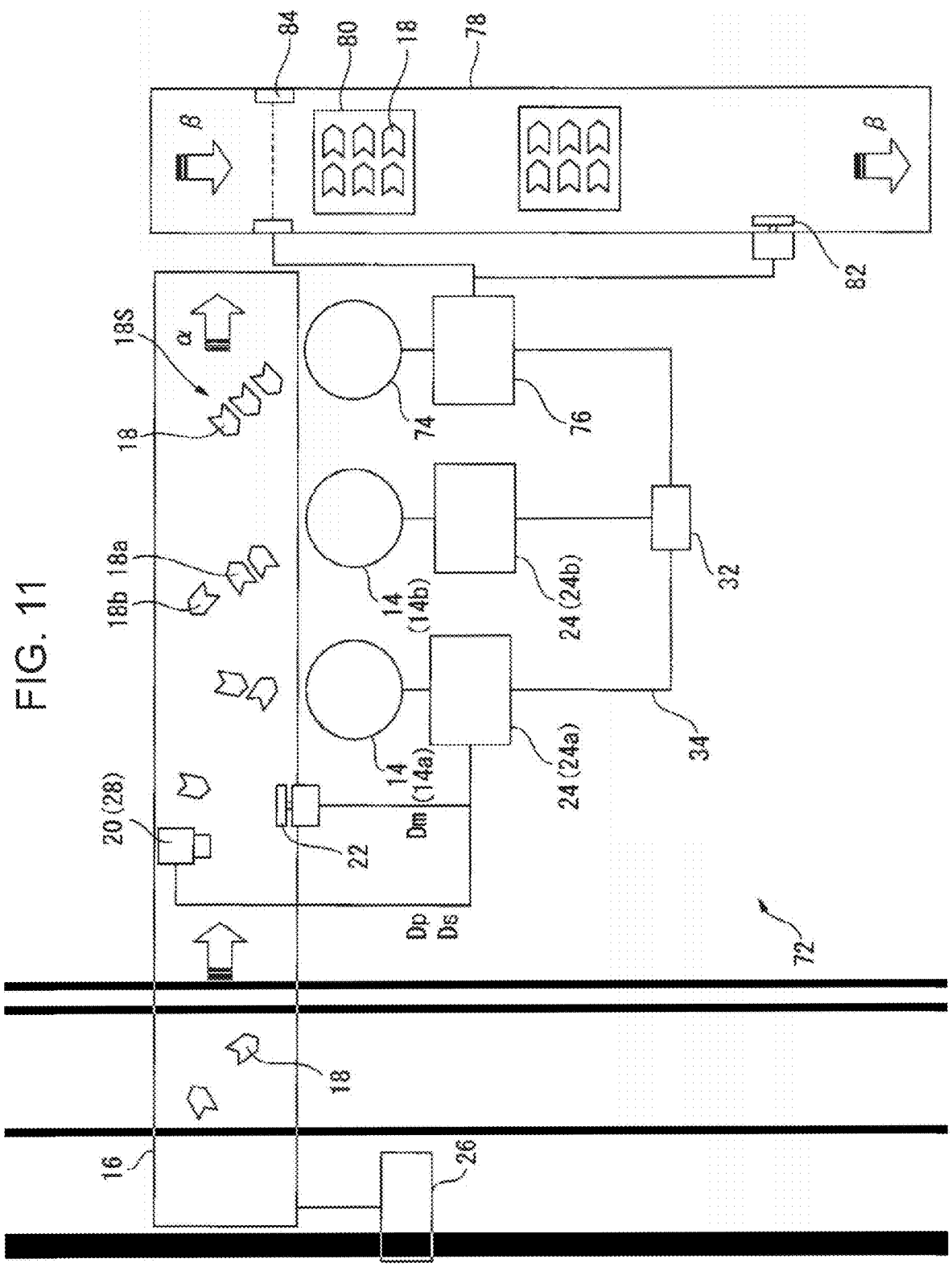
FIG. 11 is an illustration schematically depicting another exemplary configuration of a robot system subjected to a simulation.

FIG. 10 is a functional block diagram of the configuration of a simulation device 70 according to another embodiment. FIG. 11 schematically illustrates another exemplary configuration of a robot system 72 subjected to the simulation executed by the simulation device 70. The simulation device 70 and the robot system 72 have configurations analogous to the aforementioned configurations of the simulation device 10 and the robot system 12, except for a configuration relating to an article transferring motion, in which a robot 74 different from the arraying robot 14 (hereinafter referred to as a transfer robot 74) collectively transfers the plurality of articles 18 arrayed by the arraying robot 14 in the regular arrangement on the conveyor 16 to another location. The components described below, which correspond to the components of the simulation device 10 and the robot system 12, are denoted with common reference numerals, and detailed descriptions thereof are not repeated.

First, the configuration of the robot system 72 will be summarized. The robot system 72 includes, in addition to the aforementioned configuration of the robot system 12, the transfer robot 74 configured to collectively hold and transfer the articles 18 arrayed in a regular arrangement on the conveyor 16 by the arraying robot 14, a control device 76 configured to control the transfer robot 74, and a second conveyor 78 configured to convey the articles 18 transferred by the transfer robot 74 in a regular arrangement in which the articles 18 are aligned with one another. The control device 76 and the control device 24 (the first control device 24a and the second control device 24b) can communicate data to each other through a network hub 32 and a wired communication cable 34. Note that each of the number of transfer robots 74 and the number of control devices 76, included in the robot system 72, is not limited to one and may be two or more.

The transfer robot 74 may include a mechanical section appropriately selected from various known mechanical sections, such as an articulated type, a gantry type, and a parallel link type, etc., and a hand appropriately selected from various known hands, such as a suction type, a gripper type, etc. The transfer robot 74 does not need to have a configuration dedicated for the article transferring operation performed by the robot system 72, and may have a versatile configuration as well as the hand (robot 74 is hereinafter referred to as "transfer robot 74" merely for identification). The transfer robot 74 is disposed at a predetermined position on the lateral side of the conveyor 16 in the downstream side of the arraying robot 14 in the article conveying direction a, and performs the article transferring motion described below in a predetermined working space relative to the arrayed articles 18 conveyed from upstream of the conveyor 16.

The second conveyor 78 includes a known convey member capable of supporting a tray 80 carrying the articles 18 arrayed in a regular arrangement thereon and conveying it in one direction (a direction of an arrow J, in the drawing), and a known drive mechanism that continuously or intermittently drives the convey member. In the exemplary configuration of FIG. 11, the article conveying direction 3 of the second conveyor 78 is perpendicular to the article conveying direction a of the conveyor 16. The second conveyor 78 is provided with a conveyor sensor (e.g., an encoder) 82 capable of detecting a position or speed of the convey member or the drive mechanism. The conveying information of the second conveyor 78 obtained by conveyor sensor 82 is inputted to the control device 76. The control device 76 is able to communicate with the control device 24 (first and second control devices 24a, 24b) to recognize a location on the conveyor 16, at which the articles 18 are arrayed by the arraying robot 14 (first and second robots 14a, 14b).

Additionally, the control device 76 is also able to communicate with the control device 24 (first device 24a) to recognize the value of the conveyor sensor 22. The transfer robot 74 connected to the control device 76 operates based on the above information to collectively hold the articles 18 arrayed on the conveyor 16 while tracking the conveyor 16. After holding the arrayed articles 18, the transfer robot 74 places, while tracking the second conveyor 78, the collectively held articles 18 on, for example, the tray 80 detected by a phototube sensor 84 provided on the second conveyor 78, with use of the conveying information obtained by the conveyor sensor 82. In the illustrated example, the tray 80 can carry six articles 18, and the transfer robot 74 can be provided with a hand (not depicted) capable of holding six articles 18. The hand has a configuration, for example, for collectively and simultaneously holding three articles 18, and the transfer robot 74 can hold two sets of three articles 18 (article set 18S) arrayed on the conveyor 16 and thereafter place the article sets 18S on the tray 80.

The article arraying operation and the article transferring motion of the robot system 72 described above are executed according to a predetermined operation program describing the motion commands for the arraying robot 14, the conveyor 16, the sensor 20, the transfer robot 74 and the second conveyor 78. The place to which the article sets 18S are transferred by the transfer robot 74 is not limited to the second conveyor 78 but may be a stationary table, etc.

Next, referring to FIGS. 10 to 13, the configuration of the simulation device 70 for simulating the article arraying operation performed by the arraying robot 14 and the article transferring motion performed by the transfer robot 74, in the robot system 72, will be described. As depicted in FIG. 10, the simulation device 70 is provided with a model locating section 86 and a motion simulating section 88. The model locating section 86 is configured to locate a conveyor model 16M, a plurality of article models 18M, a sensor model 20M, an arraying robot model 14M and a transfer robot model 74M in a virtual space 38 (FIG. 13), which are prepared respectively by modeling the conveyor 16, the plurality of articles 18 placed on the conveyor 16, the sensor 20 detecting the articles 18, the arraying robot 14 arraying the articles 18 on the conveyor 16 and the transfer robot 74 collectively transferring the articles 18 arrayed by the arraying robot 14, each of which is a component of the robot system 72. The motion simulating section 88 is configured to make the conveyor model 16M, the sensor model 20M, the arraying robot model 14M and the transfer robot model 74M, located in the virtual space 38, simulate the article conveying motion, the article detecting motion, the article arraying motion and the article transferring motion, with respect to the plurality of article models 18M located in the virtual space 38.

The motion simulating section 88 is, in addition to the configuration of the motion simulating section 42 of the simulation device 10 described above, further provided with a transferring motion simulating section 90 configured to simulate the article transferring motion by using the information of the article conveying motion (i.e., conveying information Dm), the transfer robot model 74M moving while tracking the article conveying motion of the conveyor model 16M, by the article transferring motion, to collectively pick up and transfer the article models 18M (the article set 18S) placed in accordance with the arrangement pattern P.

Analogously to the simulation device 10, the simulation device 70 can be constituted by installing a required software on a computer such as a personal computer, and the model locating section 86 and the motion simulating section 88 (the conveying motion simulating section 44, the detecting motion simulating section 46, the arrangement pattern generating section 48, the arraying motion simulating section 50 and the transferring motion simulating section 90) may be embodied as functions added to the computer via an application software. The simulation device 70 can be provided with a display unit, such as a liquid crystal display (LCD), and an input device, such as a keyboard or a mouse (not depicted).

Figure 12:
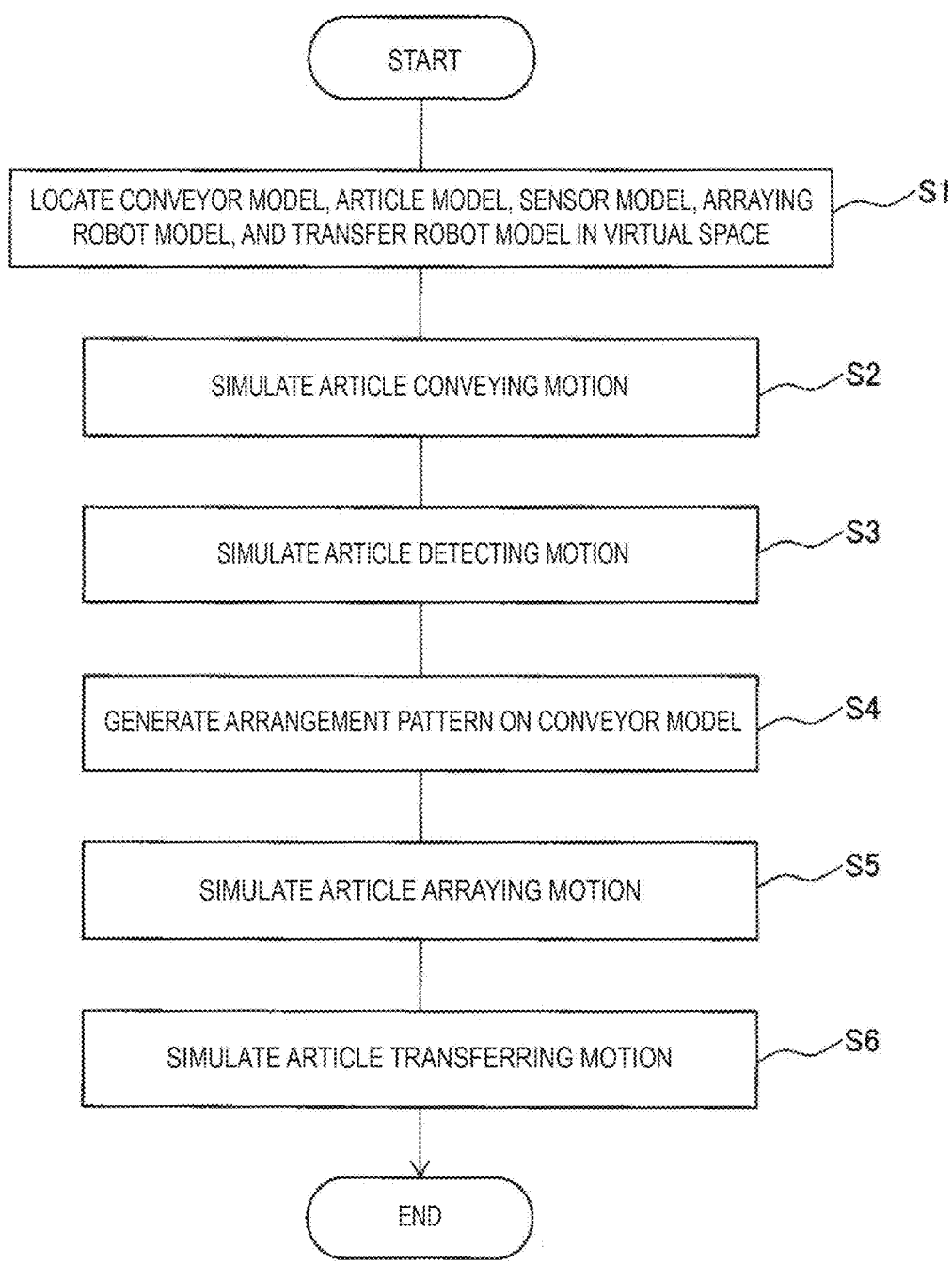
FIG. 12 is a flowchart explaining a simulation method according to another embodiment.

FIG. 12 is a flowchart depicting a simulation method according to another embodiment, which is executed by the simulation device 70. The simulation method has a configuration for simulating, on a computer, the article arraying operation performed by the arraying robot 14 and the article transferring motion performed by the transfer robot 74, and includes the following steps S1 to S6.

Step S1: The model locating section 86 of the computer locates the conveyor model 16M, the plurality of article models 18M, the sensor model 20M, the arraying robot model 14M and the transfer robot model 74M in the virtual space 38, which are prepared respectively by modeling the conveyor 16, the plurality of articles 18 placed on the conveyor 16, the sensor 20 detecting the articles 18, the arraying robot 14 arraying the articles 18 on the conveyor 16 and the transfer robot 74 collectively transferring the articles 18 arrayed by the arraying robot 14.

Step S2: The conveying motion simulating section 44 of the computer simulates the article conveying motion, the conveyor model 16M moving, by the article conveying motion, to convey the article models 18M placed in the random arrangement on the conveyor model 16M.

Step S3: The detecting motion simulating section 46 of the computer simulates the article detecting motion, the sensor model 20M operating, by the article detecting motion, to obtain the position information Dp of each of the article models 18M conveyed in the random arrangement.

Step S4: The arrangement pattern generating section 48 of the computer generates the arrangement pattern P on the conveyor model 16M by using the position information Dp, the arrangement pattern P including the plurality of pattern elements in a predetermined regular arrangement, each pattern element representing the position of each of the article models 18M.

Step S5: The arraying motion simulating section 50 of the computer simulates the article arraying motion by using the conveying information Dm and the position information Dp, the arraying robot model 14M moving while tracking the article conveying motion, by the article arraying motion, to pick up each of the article models 18M in the random arrangement and place the picked-up article model 18M in accordance with the arrangement pattern P.

Step S6: The transferring motion simulating section 90 of the computer simulates the article transferring motion by using the conveying information Dm, the transfer robot model 74M moving while tracking the article conveying motion, by the article transferring motion, to collectively pick up and transfer the plurality of article models 18M (the article model set 18MS) placed in accordance with the arrangement pattern P.

Figure 13:
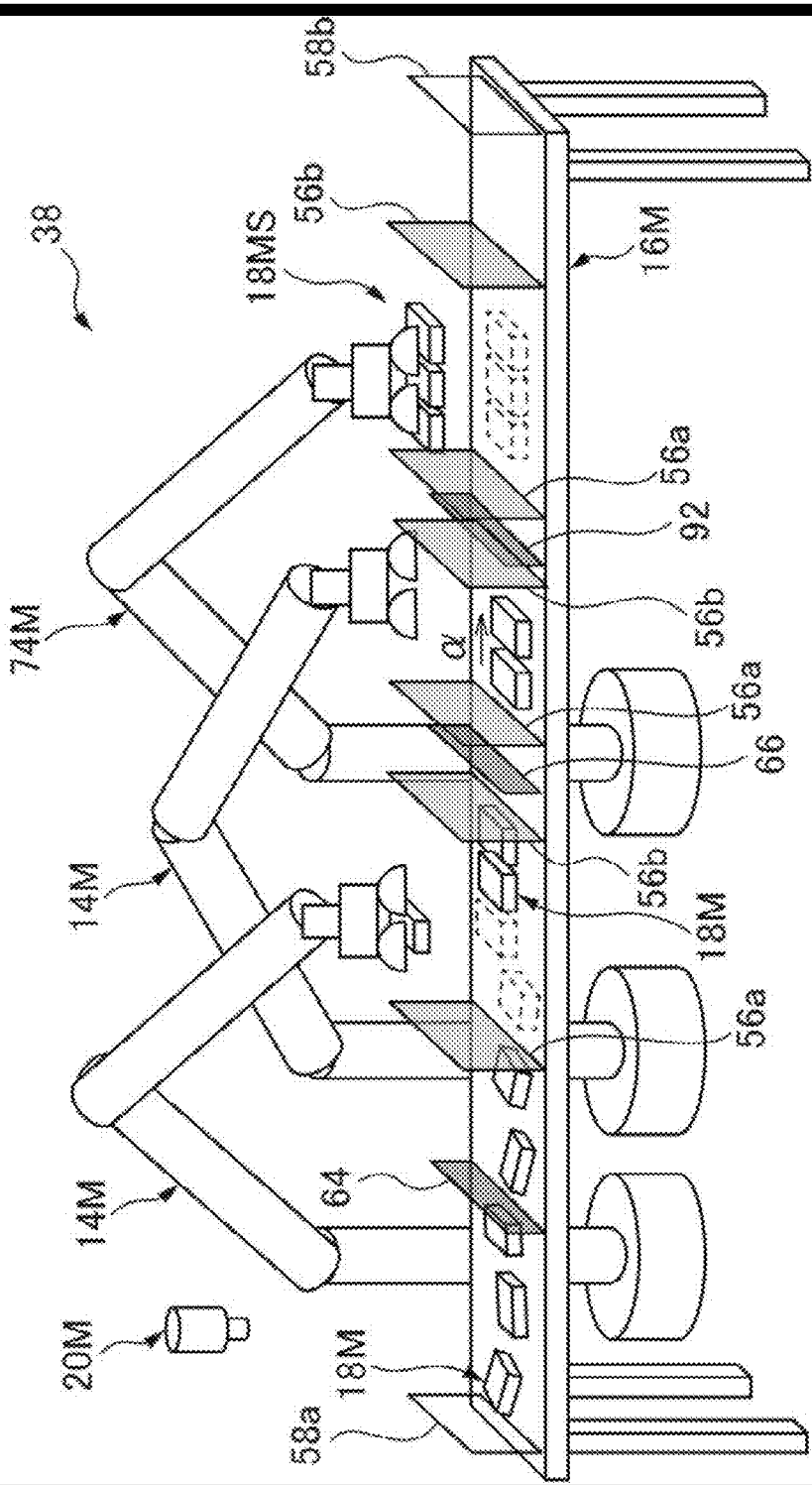
FIG. 13 is an illustration explaining a simulation method according to another embodiment and depicting a state in which models located in a virtual space are moving.

Analogously to the simulation device 10, the simulation device 70 executes a simulation of the article arraying operation and the article transferring motion by performing data processing which is essentially identical to the data processing of the actual robot system 72. FIG. 13 illustrates a model layout created by the model locating section 86 so as to correspond to the robot system 72, in a state in which the two arraying robot models 14M are performing the article arraying motion and one transfer robot model 74M is performing the article transferring motion. Analogously to FIG. 9, FIG. 13 depicts pairs of working space boundaries 56a, 56b, each pair designating the working space (in other words, the range of tracking operation) of each of the arraying robot model 14M and the transfer robot model 74M, a pair of conveyance region boundaries 58a, 58b, which designates the conveyable region of the article model 18M on the conveyor model 16M, an arrangement pattern-generation executing point 64 where the arrangement pattern generating section 48 executes the generation of the arrangement pattern P on the conveyor model 16M, and an information transmission executing point 66 where the upstream arraying robot model 14M virtually transmits the position information Dp of the article models 18M or the information of the arrangement pattern P to the downstream arraying robot model 14M. Furthermore, FIG. 13 additionally depicts an information transmission executing point 92 where the downstream arraying robot model 14M virtually transmits the position information Dp of the article models 18M or the information of the arrangement pattern P to the transfer robot model 74M.

After the model locating section 86 locates, in step S1, the arraying robot models 14M, the conveyor model 16M, the article models 18M, the sensor model 20M and the transfer robot model 74M in the virtual space 38, the motion simulating section 88 initiates the simulation of the article conveying motion, the article detecting motion, the article arraying motion and the article transferring motion, according to the operation program 60 and the operation parameters 62 (FIG. 10) applied to the actual robot system 72. Steps S2 to S5 are the same as the steps S2 to S5 depicted in FIG. 5.

Next, in step S6, the transferring motion simulating section 90 executes the simulation of the article transferring motion simulation to generate the article transferring motion in which the transfer robot model 74M moves, within its working space (between the working space boundaries 56a, 56b), to collectively hold and transfer the article model sets 18MS of the article models 18M arrayed and moving in the article conveying direction a on the upper surface of the conveyor model 16M. The transferring motion simulating section 90 can generate the article transferring motion of the transfer robot model 74M through a process similar to the aforementioned process executed in the actual robot system 12.

When the article model sets 18MS, located most downstream, passes through the information transmission executing point 92, the transferring motion simulating section 90 makes the position information Dp of the article models 18M or the information of the arrangement pattern P to be virtually sent from the downstream arraying robot model 14M to the transfer robot model 74M.

Then, the transferring motion simulating section 90 generates the article transferring motion for the transfer robot model 74M to be performed on the article model sets 18MS arrayed in the regular arrangement by the two arraying robot models 14M, and makes the transfer robot model 74M (mechanical section and hand) perform the article transferring motion.

If the robot system 72 includes a plurality of transfer robots 74, a ratio of operation may be set, as necessary, depending on how the work of the transfer robots 74 to perform the article transferring motion on the articles 18 is to be shared, and the transfer robots 74 may be controlled according to the ratio of operation, in a manner analogous to the configuration including a plurality of arraying robots 14. In this configuration, the transferring motion simulating section 90 of the simulation device 70 can make the plurality of transfer robot models 74M perform the article transferring motion in a predetermined ratio in accordance with the ratio of operation set as necessary.

According to the simulation device 70 having the above configuration, the motion simulating section 88 (the conveying motion simulating section 44, the detecting motion simulating section 46, the arrangement pattern generating section 48, the arraying motion simulating section 50 and the transferring motion simulating section 90) execute a simulation to make the conveyor model 16M, the sensor model 20M, the arraying robot model 14M and the transfer robot model 74M, located in the virtual space 38, to simulate the article conveying motion, the article detecting motion, the article arraying motion and the article transferring motion on the article models 18M located in the virtual space 38, in accordance with the operation program 60 and the various operation parameters 62, so that it is possible to verify, in the virtual space 38, whether the arraying robot model 14M can operate, while tracking the conveying motion of the conveyor model 16M, to pick up each of the article models 18M placed in the random arrangement on the conveyor model 16M and array the article models 18M in the predetermined regular arrangement on the conveyor model 16M, as well as whether the transfer robot model 74M can operate, while tracking the conveying motion of the conveyor model 16M, to collectively hold and transfer the article model sets 18MS arrayed in the regular arrangement on the conveyor model 16M (i.e., verify the validity of the operation program 60 and the operation parameters 62 associated with the article arraying operation and the article transferring operation of the actual robot system 72). If a problem is discovered in the article arraying operation or the article transferring operation, simulated by the simulation device 70, it is possible to appropriately correct the operation program 60 or the operation parameters 62 so as to solve the problem. Additionally, when the configuration of the actual robot system 72 is changed, it is possible for the simulation device 70 to simulate an article arraying operation and an article transferring operation corresponding to the changed robot system 72 and thereby optimize the operation program 60 and the operation parameters 62. Thus, according to the simulation device 70, it is possible to reduce time or cost required for setting up the robot system 72 on a production site.

While various embodiments have been described, the present disclosure may be defined in another way since the simulation device 10, 70 can be constituted by a computer, as follows:

As the other aspect of the present disclosure, a simulation program used for simulating an article arraying operation performed by a robot may be defined, the program making a computer function as a model locating section 40, 86, a conveying motion simulating section 44, a detecting motion simulating section 46, an arrangement pattern generating section 48 and an arraying motion simulating section 50. The model locating section 40, 86 is configured to locate a conveyor model 16M, a plurality of article models 18M, a sensor model 20M and an arraying robot model 14M in a virtual space 38, which are prepared respectively by modeling a conveyor 16, a plurality of articles 18 placed on the conveyor 16, a sensor 20 detecting the plurality of articles 18 and an arraying robot 14 arraying the plurality of articles 18 on the conveyor 16. The conveying motion simulating section 44 is configured to simulate an article conveying motion, the conveyor model 16M moving, by the article conveying motion, to convey the plurality of article models 18M placed in a random arrangement on the conveyor model 16M. The detecting motion simulating section 46 is configured to simulate an article detecting motion, the sensor model 20M operating, by the article detecting motion, to obtain position information Dp of each of the plurality of article models 18M conveyed in the random arrangement. The arrangement pattern generating section 48 is configured to generate an arrangement pattern P on the conveyor model 16M by using the position information Dp, the arrangement pattern P including a plurality of pattern elements in a predetermined regular arrangement, each pattern element representing a position of each of the article models 18M. The arraying motion simulating section 50 is configured to simulate an article arraying motion by using information Dm of the article conveying motion and the position information Dp, the arraying robot model 14M moving while tracking the article conveying motion, by the article arraying motion, to pick up each of the article models 18M in the random arrangement and place a picked-up article model 18M in accordance with the arrangement pattern P.

As the further aspect of the present disclosure, the computer readable recording medium 54 (FIG. 4) used for simulating an article arraying operation performed by a robot may be defined, the recording medium recording a simulation program making a computer function as a model locating section 40, 86, a conveying motion simulating section 44, a detecting motion simulating section 46, an arrangement pattern generating section 48 and an arraying motion simulating section 50. The model locating section 40, 86 is configured to locate a conveyor model 16M, a plurality of article models 18M, a sensor model 20M and an arraying robot model 14M in a virtual space 38, which are prepared respectively by modeling a conveyor 16, a plurality of articles 18 placed on the conveyor 16, a sensor 20 detecting the plurality of articles 18 and an arraying robot 14 arraying the plurality of articles 18 on the conveyor 16. The conveying motion simulating section 44 is configured to simulate an article conveying motion, the conveyor model 16M moving, by the article conveying motion, to convey the plurality of article models 18M placed in a random arrangement on the conveyor model 16M. The detecting motion simulating section 46 is configured to simulate an article detecting motion, the sensor model 20M operating, by the article detecting motion, to obtain position information Dp of each of the plurality of article models 18M conveyed in the random arrangement. The arrangement pattern generating section 48 is configured to generate an arrangement pattern P on the conveyor model 16M by using the position information Dp, the arrangement pattern P including a plurality of pattern elements in a predetermined regular arrangement, each pattern element representing a position of each of the article models 18M. The arraying motion simulating section 50 is configured to simulate an article arraying motion by using information Dm of the article conveying motion and the position information Dp, the arraying robot model 14M moving while tracking the article conveying motion, by the article arraying motion, to pick up each of the article models 18M in the random arrangement and place a picked-up article model 18M in accordance with the arrangement pattern P.

The simulation program described above may be further configured to make the computer function as a transferring motion simulating section 90. The transferring motion simulating section 90 is configured to simulate an article transferring motion by using the information Dm of the article conveying motion, the transfer robot model 74M moving while tracking the article conveying motion, by the article transferring motion, to collectively pick up and transfer the plurality of article models 18M placed in accordance with the arrangement pattern P.

While the invention has been described with reference to specific embodiments, it will be understood, by those skilled in the art, that various changes or modifications may be made thereto without departing from the scope of the following claims.

The invention claimed is:

1. A simulation device for simulating an article arraying operation performed by a robot, the simulation device comprising:
   a processor configured to:
      locate a conveyor model, a plurality of article models, a sensor model and an arraying robot model in a virtual space, which are prepared respectively by modeling a conveyor, a plurality of articles placed on the conveyor, a sensor detecting the plurality of articles and an arraying robot arraying the plurality of articles on the conveyor;
      simulate an article conveying motion, the conveyor model moving, by the article conveying motion, to convey the plurality of article models placed in a random arrangement on the conveyor model;
      simulate an article detecting motion, the sensor model operating, by the article detecting motion, to obtain position information of each of the plurality of article models conveyed in the random arrangement;

generate an arrangement pattern on the conveyor model by using the position information, the arrangement pattern including a plurality of pattern elements in a predetermined regular arrangement, each pattern element representing a position of each of the article models; and simulate an article arraying motion by using information of the article conveying motion and the position information, the arraying robot model moving while tracking the article conveying motion, by the article arraying motion, to pick up each of the article models in the random arrangement and place a picked-up article model in accordance with the arrangement pattern;

wherein the processor is further configured to
recognize a point set on the conveyor model where generation of the arrangement pattern is executed; and
generate the arrangement pattern when the article models pass through the point by the article conveying motion; wherein
the point set on the conveyor model is located downstream of the sensor model and upstream of a working space boundary which designates a working space of the arraying robot model; and
the point is set or changed in response to an input or operation of an operator.

2. The simulation device of claim 1, wherein
the processor is further configured to
locate a transfer robot model additionally in the virtual space, which is prepared by modeling a transfer robot collectively transferring the plurality of articles arrayed by the arraying robot, and
simulate an article transferring motion by using the information of the article conveying motion, the transfer robot model moving while tracking the article conveying motion, by the article transferring motion, to collectively pick up and transfer the plurality of article models placed in accordance with the arrangement pattern.

3. The simulation device of claim 1, wherein
the processor is further configured to
generate the arrangement pattern in such a manner that a first pattern element which is any one of the plurality of pattern elements coincides with a position of a reference article model which is any one of the plurality of article models placed in the random arrangement.

4. The simulation device of claim 3, wherein
the processor is further configured to
predictively judge as to whether an interference is caused between an article model being placed on a second pattern element in the generated arrangement pattern, different from the first pattern element, and another article model including the reference article model, by using shape information of each of the plurality of article models together with the position information, and
simulate the article arraying motion in consideration of a judgment result of the interference.

5. A simulation method for simulating, on a computer, an article arraying operation performed by a robot, the method comprising:
locating, by the computer, a conveyor model, a plurality of article models, a sensor model and an arraying robot model in a virtual space, which are prepared respectively by modeling a conveyor, a plurality of articles placed on the conveyor, a sensor detecting the plurality of articles and an arraying robot arraying the plurality of articles on the conveyor;

simulating, by the computer, an article conveying motion, the conveyor model moving, by the article conveying motion, to convey the plurality of article models placed in a random arrangement on the conveyor model;

simulating, by the computer, an article detecting motion, the sensor model operating, by the article detecting motion, to obtain position information of each of the plurality of article models conveyed in the random arrangement;

generating, by the computer, an arrangement pattern on the conveyor model by using the position information, the arrangement pattern including a plurality of pattern elements in a predetermined regular arrangement, each pattern element representing a position of each of the article models; and simulating, by the computer, an article arraying motion by using information of the article conveying motion and the position information, the arraying robot model moving while tracking the article conveying motion, by the article arraying motion, to pick up each of the article models in the random arrangement and place a picked-up article model in accordance with the arrangement pattern;

wherein, in the generating the arrangement pattern, the computer
recognizes a point set on the conveyor model where generation of the arrangement pattern is executed, and
generates the arrangement pattern when the article models pass through the point by the article conveying motion; wherein
the point set on the conveyor model is located downstream of the sensor model and upstream of a working space boundary which designates a working space of the arraying robot model; and
the point is set or changed in response to an input or operation of an operator.

6. The simulation method of claim 5, wherein
the locating in the virtual space includes locating, by the computer, a transfer robot model additionally in the virtual space, which is prepared by modeling a transfer robot collectively transferring the plurality of articles arrayed by the arraying robot;
the simulation method further comprising:
simulating, by the computer, an article transferring motion by using the information of the article conveying motion, the transfer robot model moving while tracking the article conveying motion, by the article transferring motion, to collectively pick up and transfer the plurality of article models placed in accordance with the arrangement pattern.

7. A non-transitory computer readable recording medium recording a simulation program for simulating an article arraying operation performed by a robot, the simulation program, when executed, causing a computer to perform:
locating a conveyor model, a plurality of article models, a sensor model and an arraying robot model in a virtual space, which are prepared respectively by modeling a conveyor, a plurality of articles placed on the conveyor, a sensor detecting the plurality of articles and an arraying robot arraying the plurality of articles on the conveyor;

simulating an article conveying motion, the conveyor model moving, by the article conveying motion, to convey the plurality of article models placed in a random arrangement on the conveyor model;

simulating an article detecting motion, the sensor model operating, by the article detecting motion, to obtain position information of each of the plurality of article models conveyed in the random arrangement;

generating an arrangement pattern on the conveyor model by using the position information, the arrangement pattern including a plurality of pattern elements in a predetermined regular arrangement, each pattern element representing a position of each of the article models; and simulating an article arraying motion by using information of the article conveying motion and the position information, the arraying robot model moving while tracking the article conveying motion, by the article arraying motion, to pick up each of the article models in the random arrangement and place a picked-up article model in accordance with the arrangement pattern;

wherein, in the generating the arrangement pattern, the computer is caused to recognize a point set on the conveyor model where generation of the arrangement pattern is executed, and generate the arrangement pattern when the article models pass through the point by the article conveying motion; wherein the point set on the conveyor model is located downstream of the sensor model and upstream of a working space boundary which designates a working space of the arraying robot model; and the point is set or changed in response to an input or operation of an operator.

* * * * *